US012621294B2

(12) United States Patent
Misawa et al.

(10) Patent No.: US 12,621,294 B2
(45) Date of Patent: May 5, 2026

(54) REMOTE ISSUANCE SYSTEM AND DATA GENERATION SERVER

(71) Applicant: KABUSHIKI KAISHA TOSHIBA, Tokyo (JP)

(72) Inventors: Yuto Misawa, Kawasaki (JP); Mizuki Uno, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 249 days.

(21) Appl. No.: 18/465,297

(22) Filed: Sep. 12, 2023

(65) Prior Publication Data

US 2024/0048554 A1 Feb. 8, 2024

Related U.S. Application Data

(63) Continuation of application No. PCT/JP2022/004002, filed on Feb. 2, 2022.

(30) Foreign Application Priority Data

Mar. 18, 2021 (JP) ................................. 2021-044573
Mar. 18, 2021 (JP) ................................. 2021-044594
Sep. 8, 2021 (JP) ................................. 2021-146164

(51) Int. Cl.
*H04L 9/40* (2022.01)

(52) U.S. Cl.
CPC ................................. *H04L 63/0861* (2013.01)

(58) Field of Classification Search
CPC ..... H04L 63/0861; G06F 21/32; G06F 21/31; G06F 21/33

(Continued)

(56) References Cited

U.S. PATENT DOCUMENTS 7,543,156 B2 * 6/2009 Campisi ............. G06Q 20/3574
713/169
8,966,657 B2 2/2015 Martinez et al.
(Continued)

FOREIGN PATENT DOCUMENTS

CN 107395369 A 11/2017
EP 3 284 274 B1 7/2019
(Continued)

OTHER PUBLICATIONS

NPL Search Terms (Year: 2025).*

(Continued)

*Primary Examiner* — Syed A Zaidi
(74) *Attorney, Agent, or Firm* — Finnegan, Henderson, Farabow, Garrett & Dunner, LLP

(57) ABSTRACT

According to an embodiment, a remote issuance system includes a portable electronic apparatus and a data generation server. The portable electronic apparatus includes a biometric sensor, a memory, a communication interface, and a first processor. The first processor generates authentication data for performing an issuance process in the portable electronic apparatus in a case where biometric authentication succeeds, outputs the authentication data to the reader/writer, and executes the issuance process based on issuance data supplied from the reader/writer. The data generation server includes a communication unit and a second processor. The second processor generates issuance data for causing the portable electronic apparatus to execute an issuance process based on application data corresponding to the contract ID and the authentication data to transmit the generated issuance data to the user terminal.

4 Claims, 12 Drawing Sheets

(58) Field of Classification Search
USPC .................................................. 726/6, 2, 20
See application file for complete search history.

(56) References Cited

U.S. PATENT DOCUMENTS

| | | | |
|---|---|---|---|
| 10,007,773 B2 | 6/2018 | Benteo et al. | |
| 10,114,976 B2 | 10/2018 | Gargiulo | |
| 10,354,055 B2 | 7/2019 | Taniguchi et al. | |
| 10,521,789 B2 * | 12/2019 | Cho .................... | G06Q 20/3226 |
| 10,523,669 B2 | 12/2019 | Fukuda et al. | |
| 10,659,956 B1 | 5/2020 | Minakuchi et al. | |
| 11,405,387 B1 * | 8/2022 | Griffin .................. | H04L 9/0866 |
| 11,569,991 B1 * | 1/2023 | Griffin ...................... | H04L 9/50 |
| 2004/0026496 A1 * | 2/2004 | Zuili ..................... | G07F 7/0886 |
| | | | 235/379 |
| 2006/0102717 A1 * | 5/2006 | Wood ..................... | G06Q 10/10 |
| | | | 235/382 |
| 2009/0080708 A1 * | 3/2009 | Mellen .................... | G06F 21/32 |
| | | | 382/115 |
| 2013/0047209 A1 | 2/2013 | Satoh et al. | |
| 2015/0046699 A1 | 2/2015 | Benteo et al. | |
| 2016/0197919 A1 * | 7/2016 | Senthurpandi .......... | G06F 21/32 |
| | | | 713/186 |
| 2018/0276358 A1 | 9/2018 | Sawamura | |
| 2019/0180018 A1 * | 6/2019 | Miura ....................... | G06T 7/00 |
| 2019/0386826 A1 * | 12/2019 | Kato ................... | H04L 63/0861 |
| 2021/0176244 A1 * | 6/2021 | Chow ................... | H04L 9/3247 |
| 2021/0256342 A1 * | 8/2021 | Leung ................... | G07F 7/0893 |
| 2021/0357489 A1 * | 11/2021 | Tali ....................... | H04L 9/3228 |
| 2022/0158994 A1 * | 5/2022 | Kamal .............. | G06Q 20/3274 |
| 2022/0191032 A1 * | 6/2022 | Arora ..................... | H04L 9/008 |
| 2022/0207914 A1 * | 6/2022 | Voss ................... | G06V 40/166 |
| 2022/0210153 A1 * | 6/2022 | Voss .......................... | G06T 5/50 |
| 2022/0217137 A1 * | 7/2022 | Hertel .................. | H04L 63/107 |
| 2022/0284084 A1 * | 9/2022 | Deng ................. | G06V 40/1347 |
| 2022/0300592 A1 * | 9/2022 | Jogand-Coulomb ... | G06F 21/32 |
| 2025/0070979 A1 * | 2/2025 | Mars ..................... | H04L 9/3231 |
| 2025/0094988 A1 * | 3/2025 | Trinh .............. | G06Q 20/40145 |

FOREIGN PATENT DOCUMENTS

| | | |
|---|---|---|
| EP | 3 288 214 B1 | 3/2021 |
| EP | 3 161 996 B1 | 4/2021 |
| FR | 2 988 196 A1 | 9/2013 |
| FR | 2 988 197 A1 | 9/2013 |
| JP | 2007-128468 A | 5/2007 |
| JP | 2011-198317 A | 10/2011 |
| JP | 2016-167201 A | 9/2016 |
| JP | 2017-522807 A | 8/2017 |
| JP | 2018-5271 A | 1/2018 |
| JP | 2018-45330 A | 3/2018 |
| JP | 2018-512822 A | 5/2018 |
| JP | 2019-200683 A | 11/2019 |
| JP | 2020-96324 A | 6/2020 |
| JP | 2020-107101 A | 7/2020 |
| JP | 2020-115386 A | 7/2020 |

OTHER PUBLICATIONS

European Patent Office, Extended European Search Report in EP App. No. 22770911.0, 15 pages (Feb. 7, 2025).

Junya Suzuki, "What will change from a conventional SIM? Find out what an 'eSIM' is.," ITmedia, https://www.itmedia.co.jp/mobile/articles/1706/05/news100.html, 3 pages, and translation, 4 pages (2017).

Toppan Printing Co, Ltd., "Toppan Printing begins offering the world's first authenticity determination service using 'Smartics-V,' an IC tag equipped with PUF technology that uses individual semiconductor differences ~ NFC-enabled smart phones enable consumers to determine the authenticity of products themselves~," https://www.toppan.co.jp/news/2013/09/newsrelease130925.html, 2 pages, and translation, 3 pages (2013).

Japan Patent Office, Int'l Search Report in Application No. PCT/JP2022/004002 (May 17, 2022), 2 pages.

Intellectual Property Office of Singapore, Notice for Eligibility of Grant in SG App. No. 11202306716U (Feb. 3, 2026).

* cited by examiner

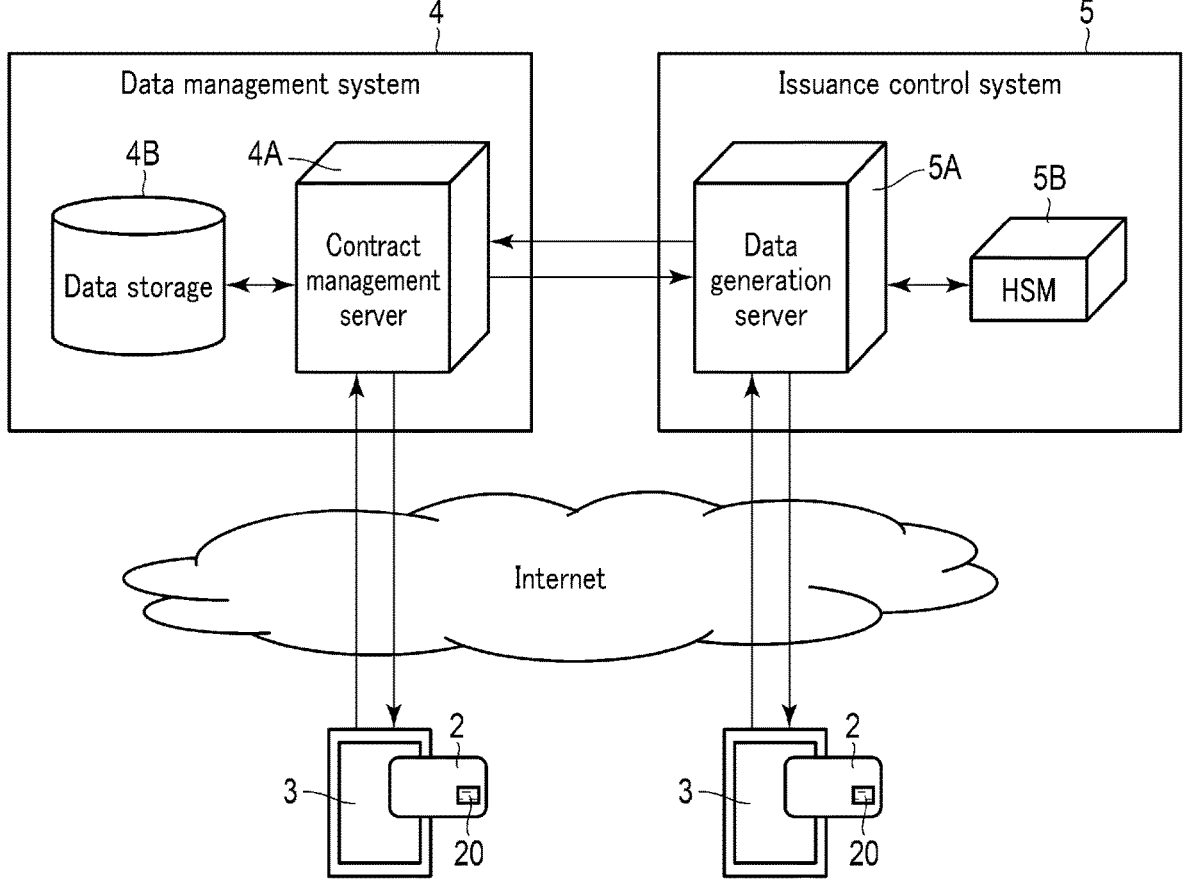
F I G. 1

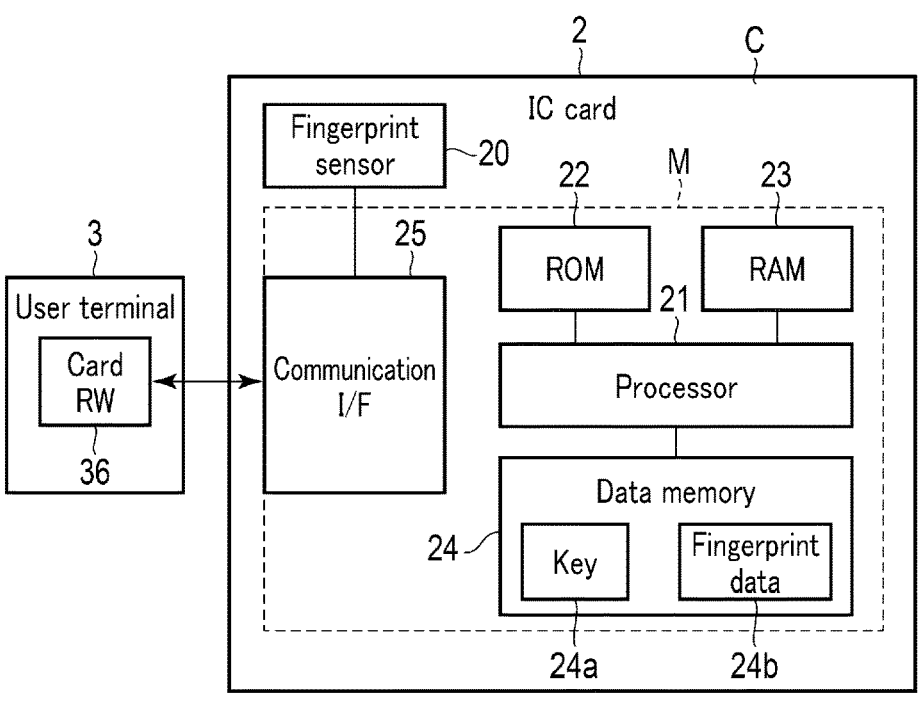
F I G. 2
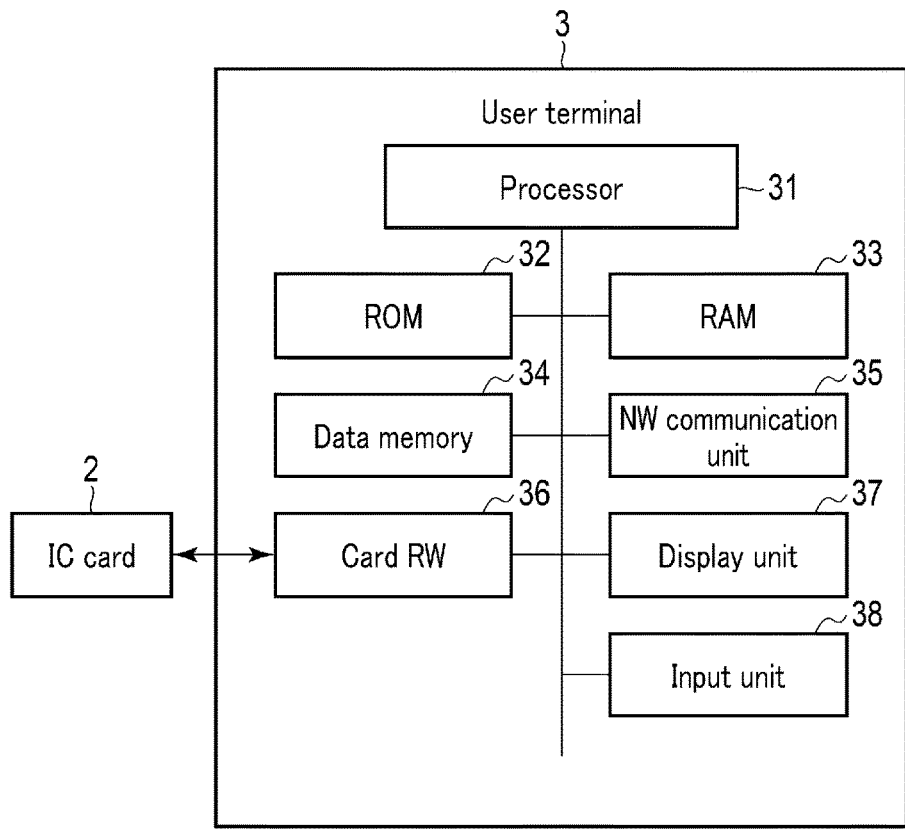
F I G. 3

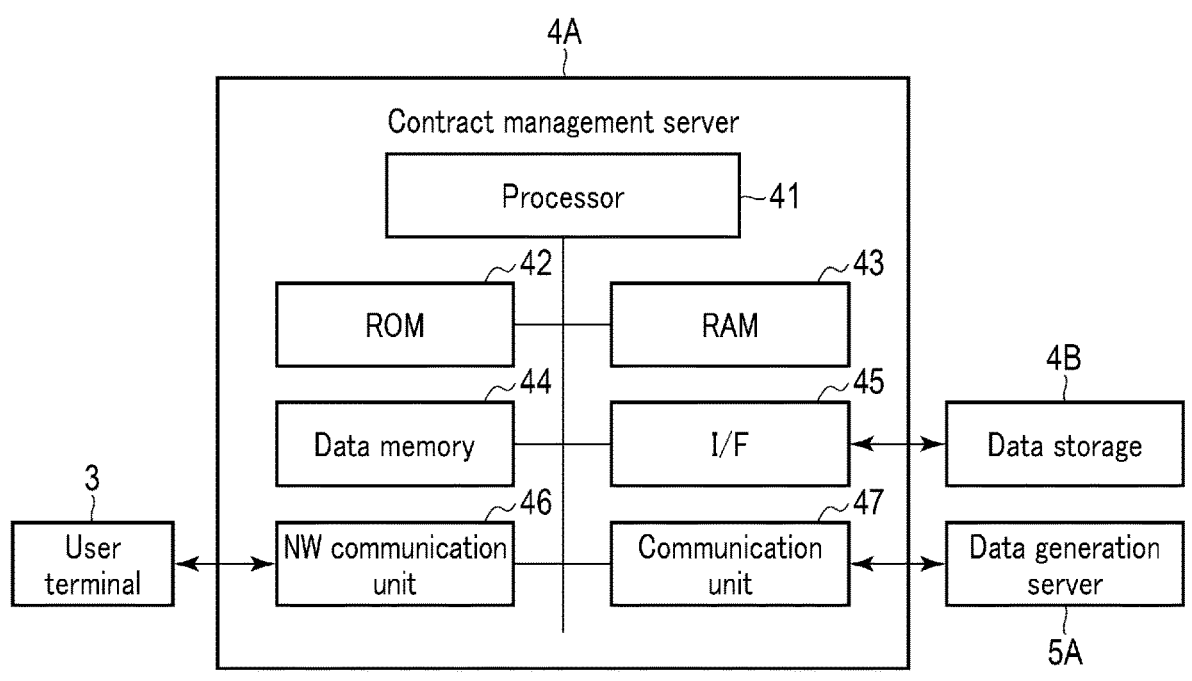
F I G. 4
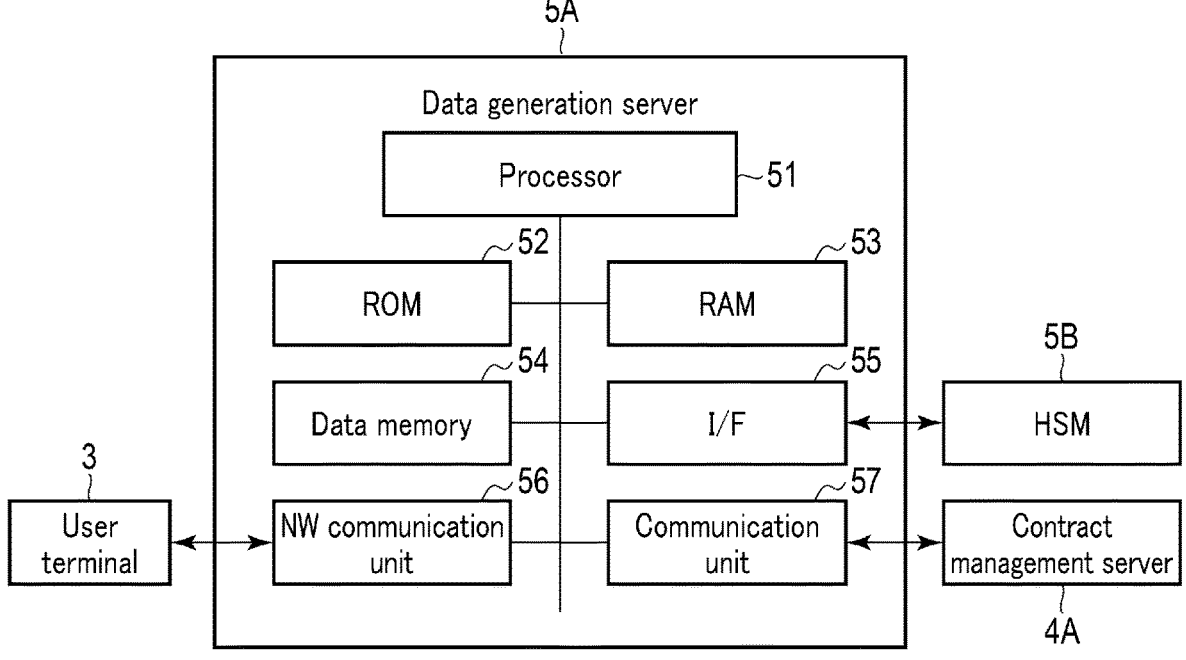
F I G. 5

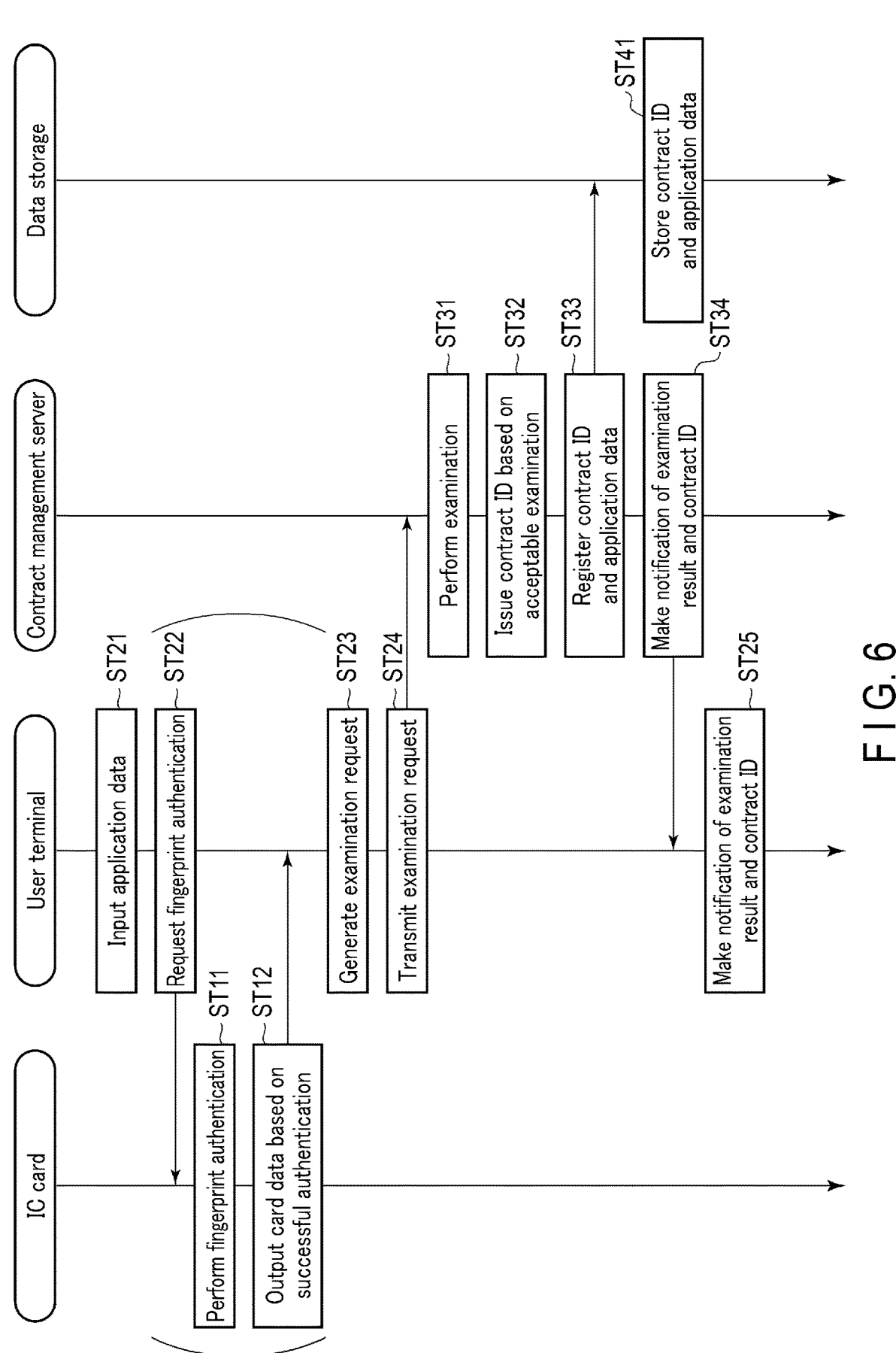
F I G. 6

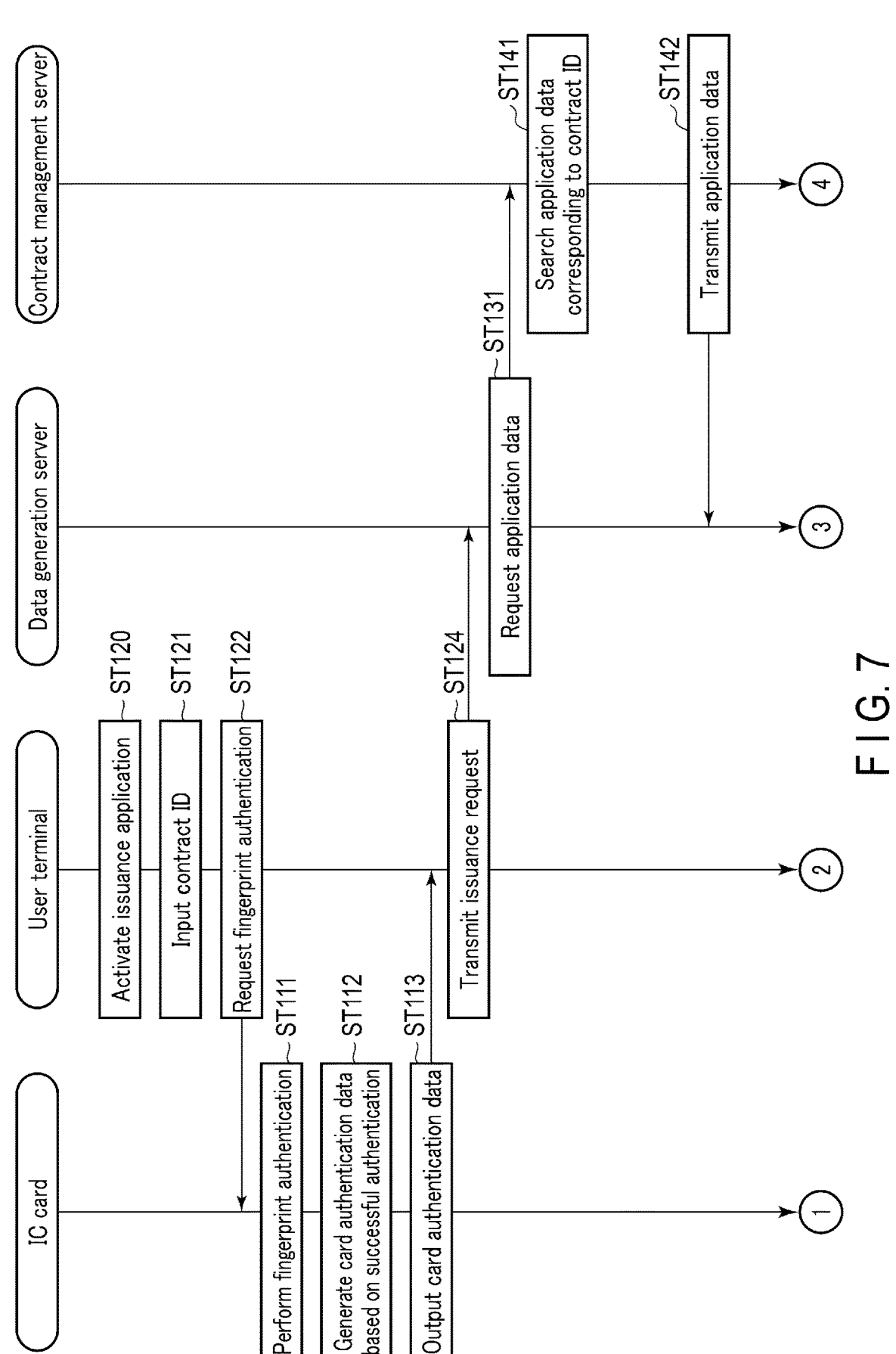
F I G. 7

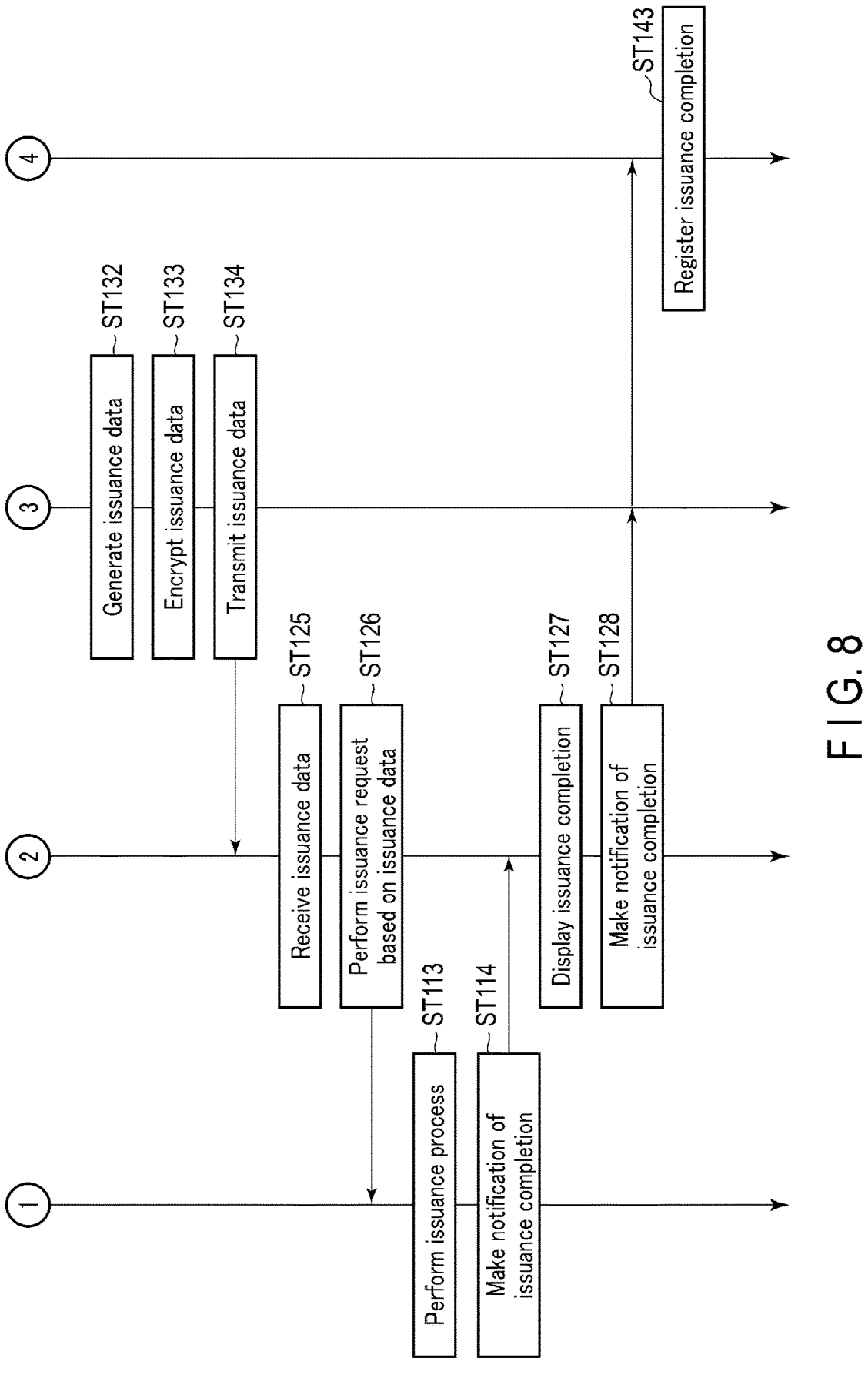
F I G. 8

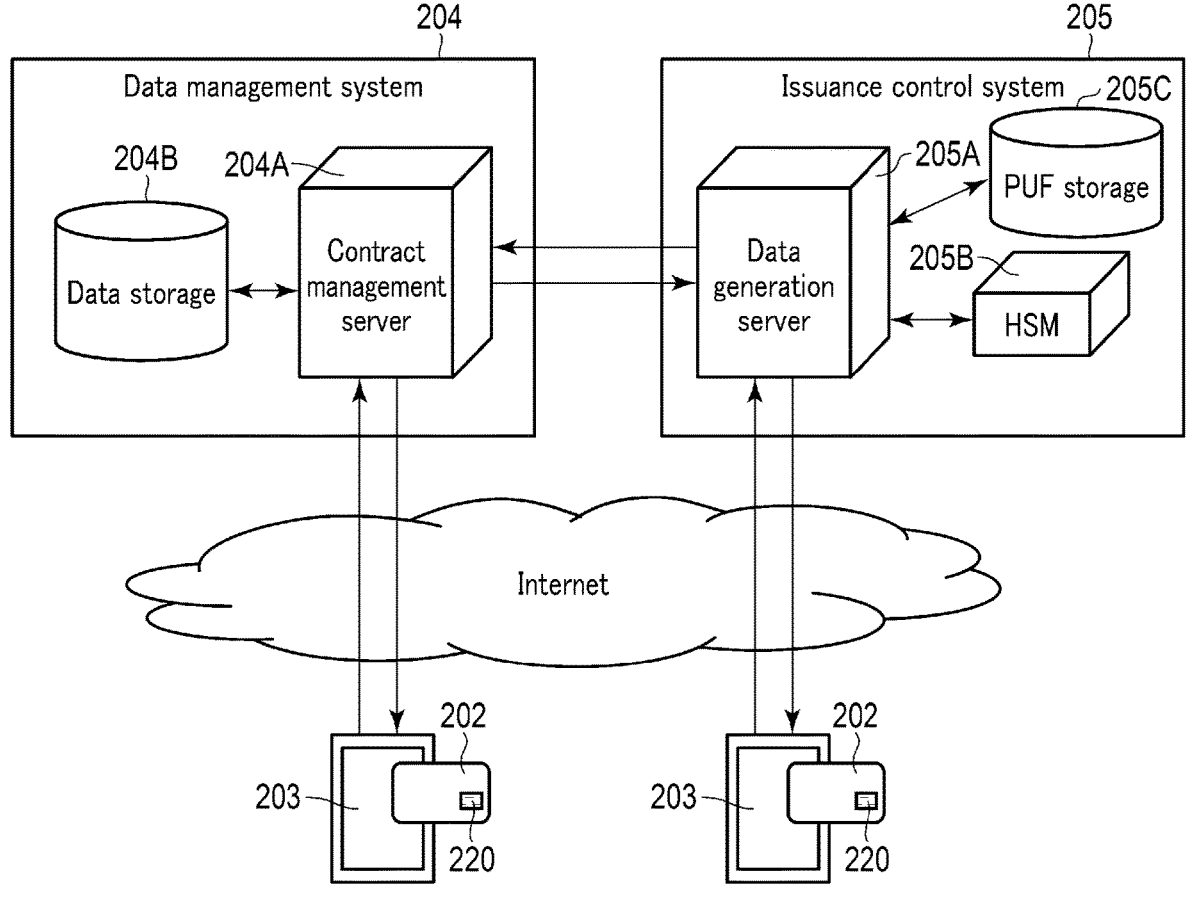
F I G. 9

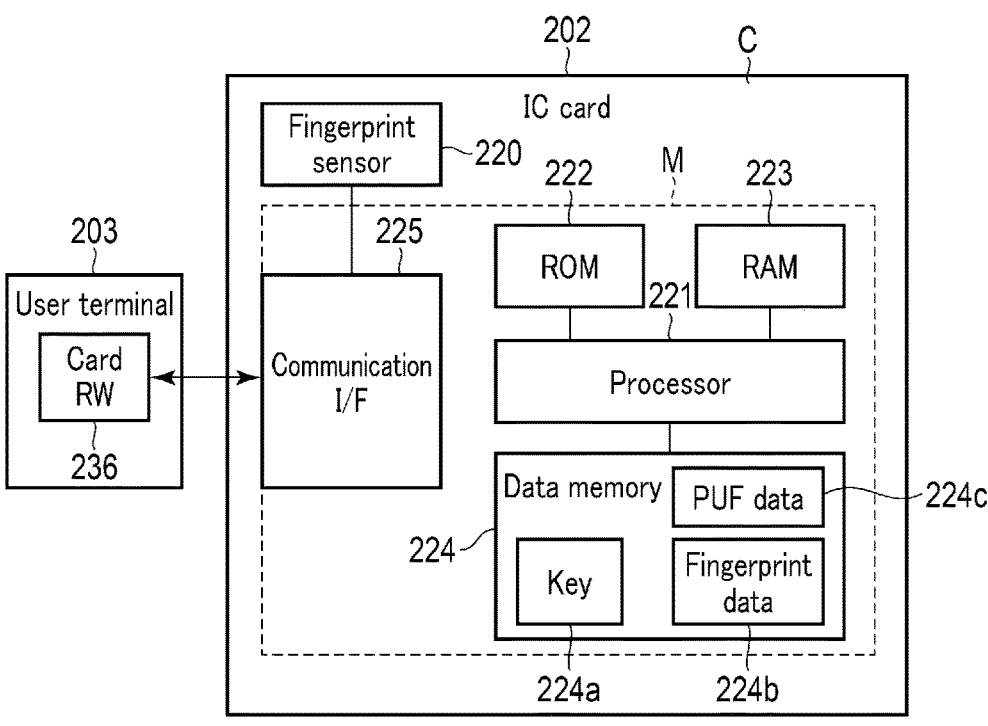
F I G. 10
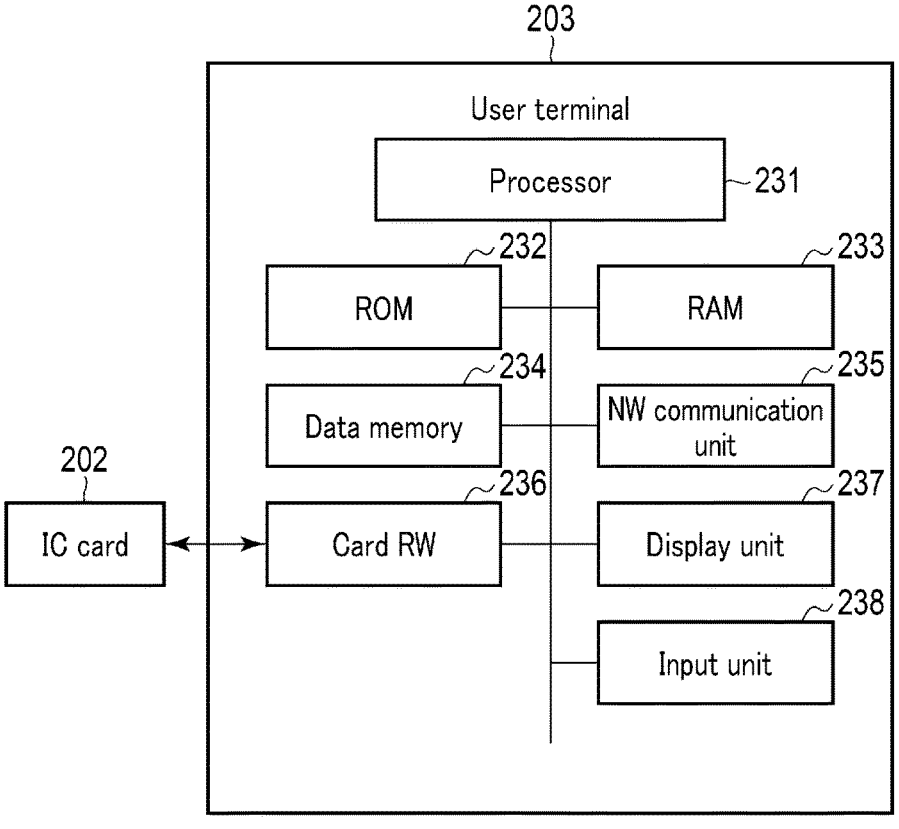
F I G. 11

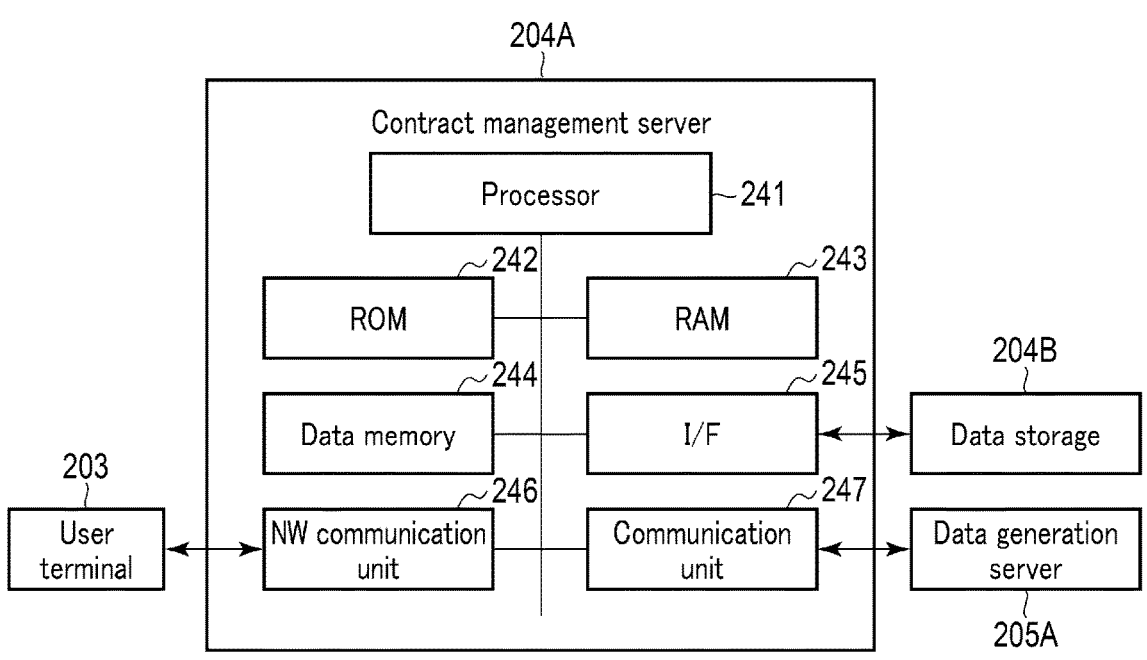
F I G. 12
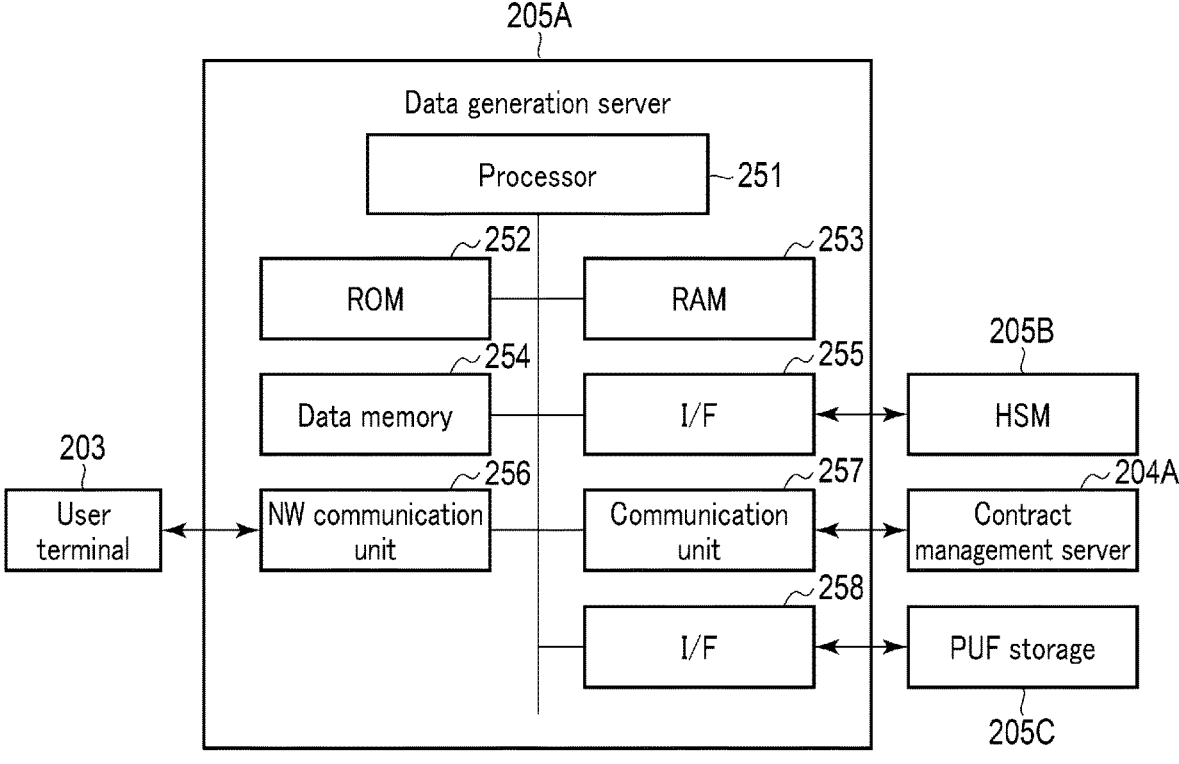
F I G. 13

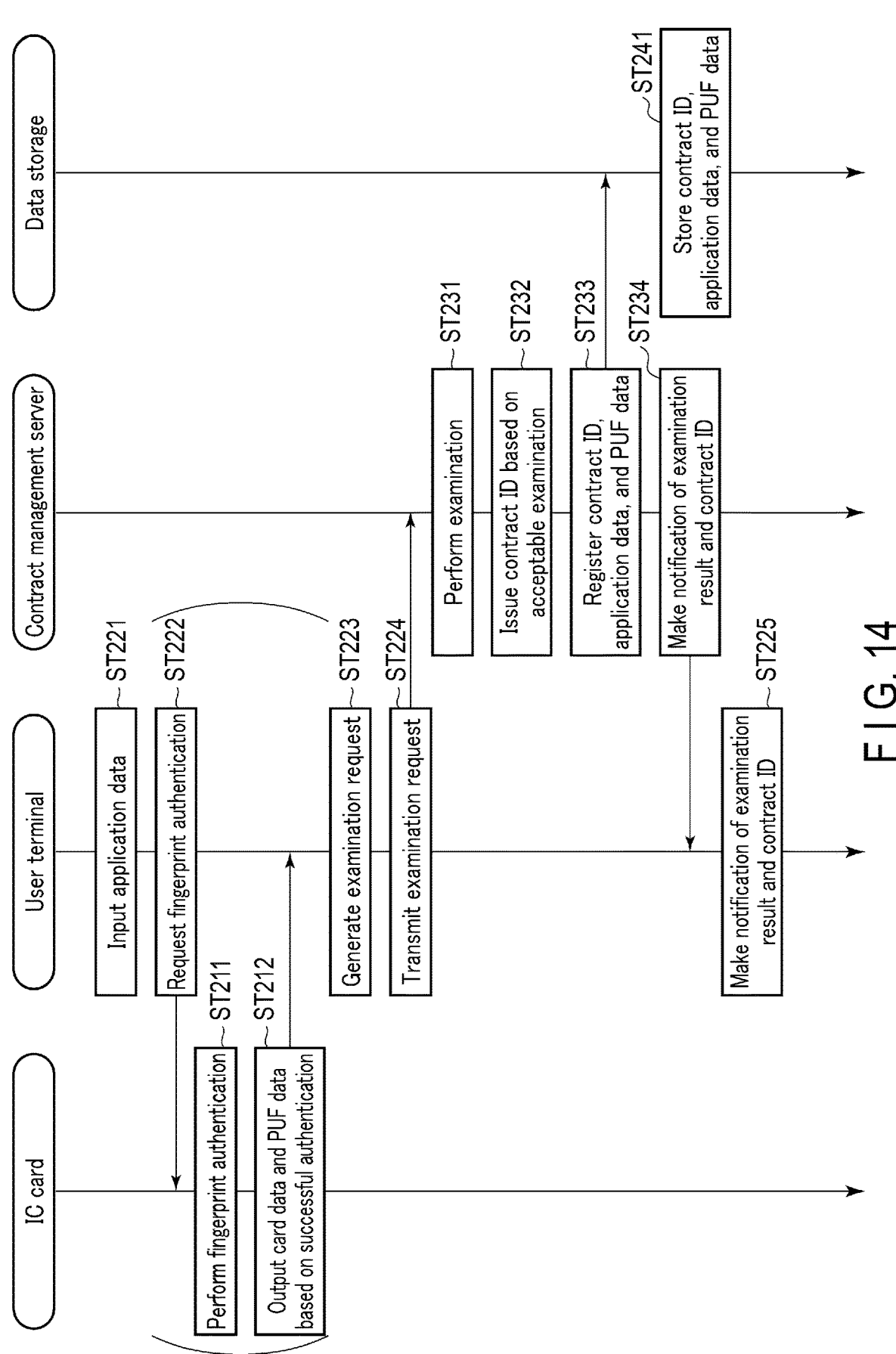
F I G. 14

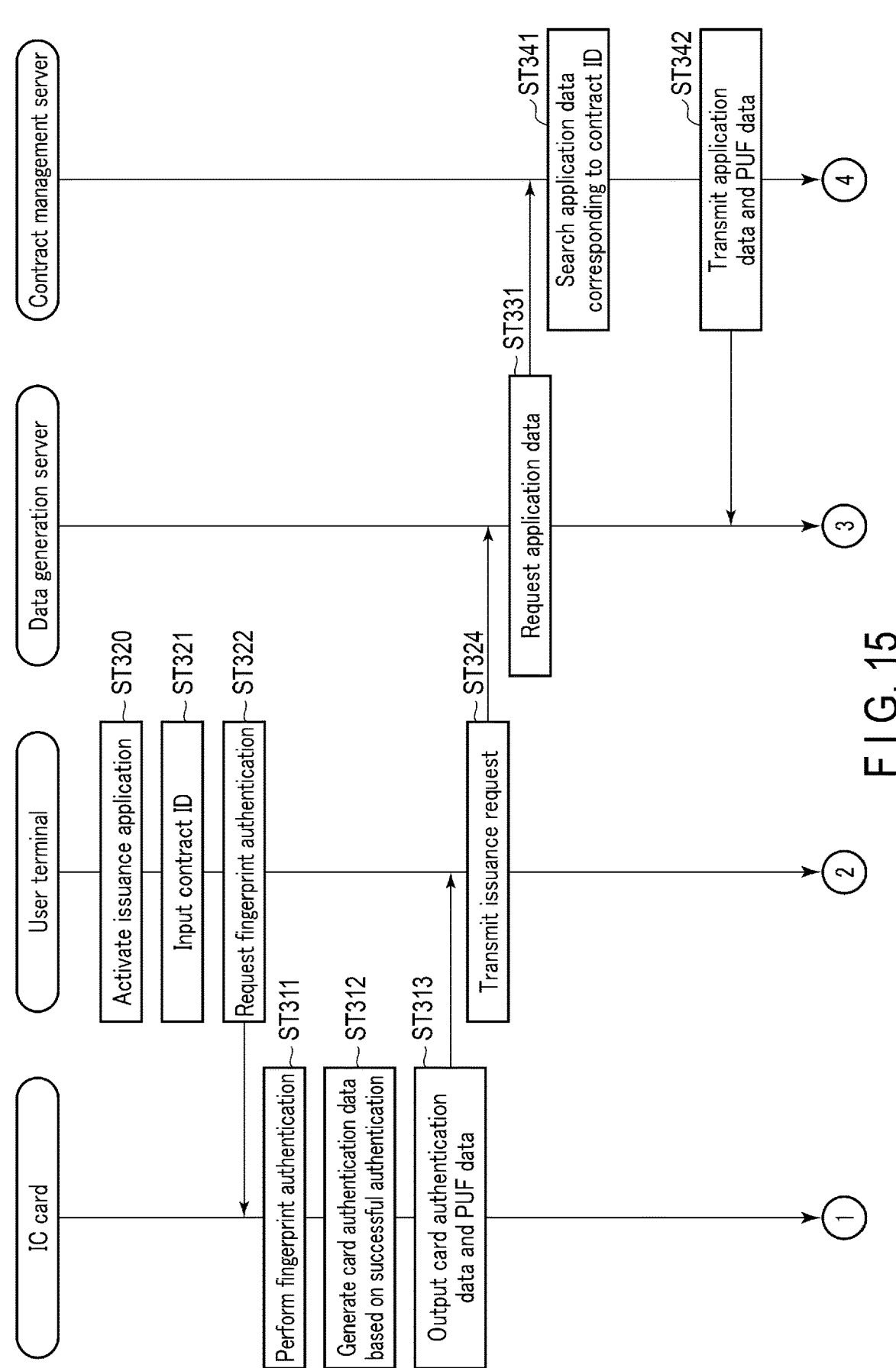
F I G. 15

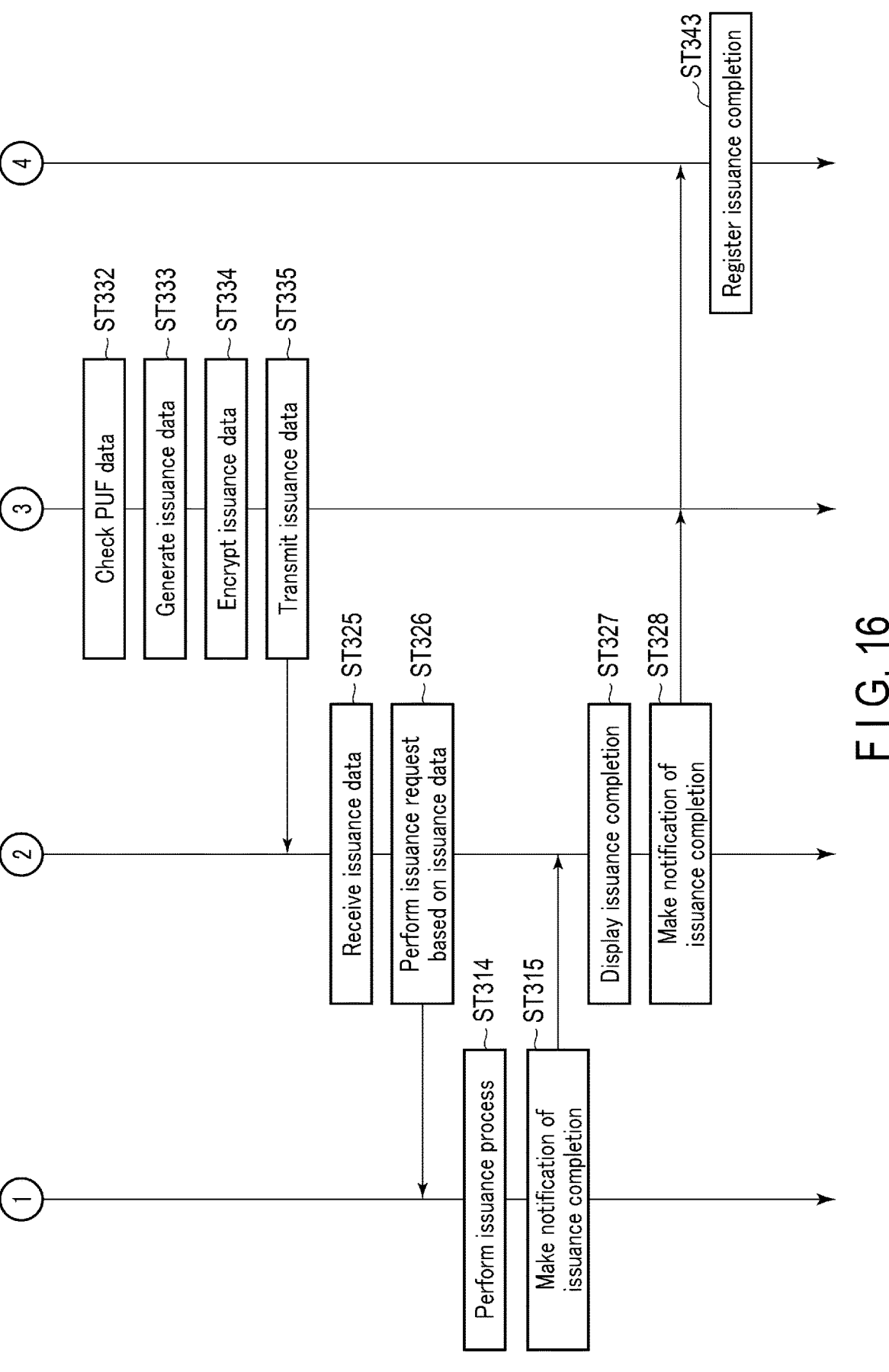
F I G. 16

REMOTE ISSUANCE SYSTEM AND DATA GENERATION SERVER

CROSS REFERENCE TO RELATED APPLICATIONS

This application is a Continuation Applications of PCT Application No. PCT/JP2022/004002, filed Feb. 2, 2022 and based upon and claiming the benefit of priority from Japanese Patent Applications No. 2021-044573, filed Mar. 18, 2021; and No. 2021-044594, filed Mar. 18, 2021; and No. 2021-146164, filed Sep. 8, 2021, the entire contents of all of which are incorporated herein by reference.

FIELD

Embodiments of the present invention relate to a remote issuance system and a data generation server.

BACKGROUND

In the related art, an IC card as a portable electronic apparatus requires a procedure called secondary issuance in which an operation institution writes information for operating as a credit card or the like and enables the credit card to be used. In addition, even in a case where a new function is added to the IC card, a predetermined procedure by the operation institution is required. In the related art, secondary issuance and function addition to an IC card are performed using a dedicated issuance machine after a person in charge of an operation institution or a handling store confirms identity confirmation of a user with an official certificate or the like.

In the procedure of an issuance process such as secondary issuance and function addition to the conventional IC card as described above, it is necessary for the user to go to a designated place such as an operation institution or a store, and for staff in the designated place to perform identity confirmation. In addition, in recent years, an IC card having a function of performing identity confirmation using biometric information such as a fingerprint has been developed, but even with such an IC card having a biometric authentication function, there is a problem that it is necessary to perform an issuance process such as secondary issuance and function addition by a procedure similar to that of the conventional IC card.

BRIEF DESCRIPTION OF THE DRAWINGS

FIG. 1 is a diagram schematically illustrating a configuration example of an IC card issuance system as a remote issuance system according to the first embodiment.

FIG. 2 is a block diagram illustrating a configuration example of an IC card for which an issuance procedure is performed by an IC card issuance system as a remote issuance system according to the first embodiment.

FIG. 3 is a block diagram illustrating a configuration example of a mobile terminal in the IC card issuance system as the remote issuance system according to the first embodiment.

FIG. 4 is a block diagram illustrating a configuration example of a contract management server in the IC card issuance system as the remote issuance system according to the first embodiment.

FIG. 5 is a block diagram illustrating a configuration example of a data generation server in the IC card issuance system as the remote issuance system according to the first embodiment.

FIG. 6 is a sequence for describing an operation example of an application procedure in the IC card issuance system as the remote issuance system according to the first embodiment.

FIG. 7 is a sequence for describing an operation example of an issuance procedure in the IC card issuance system as the remote issuance system according to the first embodiment.

FIG. 8 is a sequence for describing an operation example of an issuance procedure in the IC card issuance system as the remote issuance system according to the first embodiment.

FIG. 9 is a diagram schematically illustrating a configuration example of an IC card issuance system as a remote issuance system according to the second embodiment.

FIG. 10 is a block diagram 10 illustrating a configuration example of an IC card for which an issuance procedure is performed by the IC card issuance system as the remote issuance system according to the second embodiment.

FIG. 11 is a block diagram 11 illustrating a configuration example of a mobile terminal in the IC card issuance system as the remote issuance system according to the second embodiment.

FIG. 12 is a block diagram 12 illustrating a configuration example of a contract management server in the IC card issuance system as the remote issuance system according to the second embodiment.

FIG. 13 is a block diagram 13 illustrating a configuration example of a data generation server in the IC card issuance system as the remote issuance system according to the second embodiment.

FIG. 14 is a sequence for 14 describing an operation example of an application procedure in the IC card issuance system as the remote issuance system according to the second embodiment.

FIG. 15 is a sequence for 15 describing an operation example of an issuance procedure in the IC card issuance system as the remote issuance system according to the second embodiment.

FIG. 16 is a sequence for 16 describing an operation example of an issuance procedure in the IC card issuance system as the remote issuance system according to the second embodiment.

DETAILED DESCRIPTION

According to an embodiment, a remote issuance system includes a portable electronic apparatus and a data generation server. The portable electronic apparatus includes a biometric sensor, a memory, a communication interface, and a first processor. The biometric sensor acquires biometric information. The memory includes a storage area in which biometric information of a user is stored. The communication interface communicates with a reader/writer connected to a user terminal. The first processor generates authentication data for performing an issuance process in the portable electronic apparatus in a case where biometric authentication by collation between biometric information acquired by the biometric sensor and biometric information stored in the memory succeeds, outputs the authentication data to the reader/writer, and executes the issuance process based on issuance data corresponding to the authentication data supplied from the reader/writer. The data generation server includes a communication unit and a second processor. The communication unit communicates with the user terminal. The second processor generates, in a case where an issuance request including the authentication data generated by the portable electronic apparatus and a contract ID is received from the user terminal, issuance data for causing the portable electronic apparatus to execute an issuance process based on application data corresponding to the contract ID and the authentication data to transmit the generated issuance data to the user terminal.

Hereinafter, first and second embodiments will be described with reference to the drawings.

First Embodiment

First, an IC card issuance system 1 as a remote issuance system according to a first embodiment will be described.

FIG. 1 is a diagram schematically illustrating a configuration example of the IC card issuance system 1 as a remote issuance system according to a first embodiment.

In the configuration example illustrated in FIG. 1, the IC card issuance system 1 includes an IC card 2, a user terminal 3, a data management system 4, and an issuance control system 5.

The IC card 2 is an example of a portable electronic apparatus having a function of executing biometric authentication. The IC card 2 according to the first embodiment includes a biometric sensor 20 configured to acquire biometric information as authentication information acquired from a person. For example, the biometric sensor 20 included in the IC card 2 is a fingerprint sensor that reads a fingerprint as an example of biometric information. The IC card 2 including a fingerprint sensor 20 as a biometric sensor executes fingerprint authentication (biometric authentication) as identity confirmation by collating a fingerprint of a person read by the fingerprint sensor with a fingerprint of a registrant (user, card holder) registered in advance in a memory in the IC card 2.

In the first embodiment, the IC card 2 will be described as a fingerprint sensor card having a function of performing biometric authentication using a fingerprint as biometric information. However, the IC card 2 as the portable electronic apparatus according to the first embodiment is not limited to one that performs fingerprint (biometric) authentication by fingerprint as biometric information. For example, the portable electronic apparatus exemplified by the IC card 2 may perform biometric authentication by biometric information other than a fingerprint.

The user terminal 3 is an information processing apparatus possessed by the user. The user terminal 3 is, for example, a smartphone, a tablet PC, a personal computer, or the like. The user terminal 3 is only required to be operated by the user himself/herself and include a card reader/writer that communicates with the IC card 2 and a communication unit that communicates with each of the servers 4A and 5A via a network such as the Internet. In addition, the user terminal 3 may include an interface that is connected to a card reader/writer as external equipment instead of including a card reader/writer that communicates with the IC card 2.

The data management system 4 is a system that remotely accepts an application for the issuance process (secondary issuance, function addition, or the like) of an IC card held by a user. The data management system 4 includes a contract management server 4A and a data storage 4B. The contract management server 4A is configured by a server apparatus. The data storage 4B is a device including a storage apparatus accessible from the contract management server 4A. The contract management server 4A has a function of accessing the data storage 4B, a function of communicating with the user terminal 3 via the Internet, and a function of communicating with a data generation server 5A of the issuance control system 5.

The contract management server 4A communicates with the user terminal 3 possessed by the user, and acquires application data related to the issuance process (contract) of an IC card possessed by the user from the user terminal 3. Here, the issuance process of an IC card includes secondary issuance or function addition. The secondary issuance of the IC card is a process including a process (personalization) of writing personal data and the like to the IC card passed from the issuer to the user (card holder). In addition, the function addition is a process of adding an application or the like to the IC card. For example, the function addition includes a process of adding an applet to an IC card as a Java (registered trademark) card.

After acquiring the application data from the user terminal 3, the contract management server 4A issues the contract ID when the contract of the application content based on the application data from the user terminal 3 is allowed. When the contract ID is issued, the contract management server 4A makes notification to the issued user terminal 3 to store application data and the like associated with the contract ID in the data storage 4B. In response to an inquiry about application data based on the contract ID from the data generation server 5A in the issuance control system 5, the contract management server 4A provides application data corresponding to the contract ID stored in the data storage 4B.

The issuance control system 5 is a system for remotely causing the IC card to execute the issuance process (secondary issuance or function addition). The issuance control system 5 includes the data generation server 5A and a hardware security module (HSM) 5B. The data generation server 5A is configured by a server apparatus. The HSM 5B is a device that securely stores key information and performs an encryption process using the key information. The data generation server 5A has a function of accessing the HSM 5B, a function of communicating with the user terminal 3 via the Internet, and a function of communicating with the contract management server 4A of the data management system 4.

The data generation server 5A performs secure communication with the IC card 2 via the user terminal 3 using the key stored in the HSM 5B and the encryption processing function. The data generation server 5A acquires an issuance request including card authentication data generated by the IC card 2 using the key information and the contract ID from the user terminal 3.

The data generation server 5A acquires application data managed by the contract management server 4A of the data management system 4 in response to the issuance request from the user terminal 3. The data generation server 5A generates, based on the application data acquired in response to the issuance request, issuance data for causing the IC card possessed by the user to perform the issuance process using key information stored in the HSM 5B, and supplies the generated issuance data to the user terminal 3.

Next, a configuration of a control system of the IC card 2 as the portable electronic apparatus according to the first embodiment will be described.

FIG. 2 is a block diagram illustrating a configuration example of the IC card 2 as the portable electronic apparatus according to the first embodiment.

The IC card 2 is an example of a portable electronic apparatus that is activated (is operable) by power supplied from an external apparatus. The IC card 2 is also referred to as a smart card. As illustrated in FIG. 2, the IC card 2 has a main body C. The main body C is formed in a card shape by plastic or the like. A control module M is disposed in the main body C of the IC card 2. The control module M is integrally formed in a state where a communication interface is connected to one or a plurality of IC chips.

In the configuration example illustrated in FIG. 2, the control module M includes a processor 21, a ROM 22, a RAM 23, a data memory 24, and a communication interface 25. In addition, in the main body C of the IC card 2, a display 26 and a fingerprint sensor 27 as a biometric sensor are connected to the control module M.

The processor 21 includes a circuit that executes various processes. The processor 21 is, for example, a central processing unit (CPU). The processor 21 controls the entire IC card 2. The processor 21 implements various processing functions by executing programs stored in the ROM 22 or the data memory 24. However, some or all of various functions executed by the processor 21 described later may be implemented by a hardware circuit.

The ROM 22 is a nonvolatile memory that functions as a program memory. The ROM 22 stores a control program, control data, and the like in advance. The ROM 22 is incorporated in the IC card 2 in a state where a control program, control data, and the like are stored at a manufacturing stage. The control program and the control data stored in the ROM 22 are incorporated in advance according to the specification of the IC card 2. For example, the ROM 22 stores a program for the processor 21 to execute processing according to a command received from an external apparatus (card reader/writer).

The RAM 23 is a volatile memory that functions as a working memory. The RAM 23 also functions as a buffer that temporarily stores data and the like being processed by the processor 21. For example, the RAM 23 functions as a communication buffer that temporarily stores data to be transmitted to and received from an external apparatus via the communication interface 25.

The data memory 24 is a nonvolatile memory capable of writing and rewriting data. The data memory 24 includes, for example, an electrically erasable programmable read only memory (EEPROM) (registered trademark). Programs and various pieces of data according to the operation application of the IC card 2 are written to the data memory 24. In the data memory 24, a program file, a data file, or the like is defined, and a control program and various pieces of data are written in these files. In addition, the data memory 24 has tamper resistance in part of or all of the area, and can securely store data.

The data memory 24 includes a first recording area 24a that stores key information and a second storage area 24b that stores biometric information. The first storage area 24a is a tamper-resistant memory capable of securely storing data. Key information is written in the first storage area 24a in a process (primary issuance) of making the IC card 2 usable. In the present IC card issuance system 1, key information corresponding to key information written in the first storage area 24a of the IC card 2 that has been primarily issued is stored in the HSM 5B in the issuance control system 5.

In addition, the second storage area 24b stores biometric information of the user who is the owner of the IC card 2. For example, it is assumed that the IC card 2 is a fingerprint sensor card that performs biometric information using a fingerprint as biometric information. In a case where the IC card 2 is a fingerprint sensor card, fingerprint information as biometric information of the user who is the owner is written in the second storage area 24b of the IC card 2. Note that, in the first embodiment described below, it is assumed that the IC card 2 is possessed by the user in a state in which fingerprint information as biometric information of the user is written in the second storage area before the secondary issuance or the function addition is executed.

The communication interface 25 includes a communication control unit and an interface unit, and constitutes a communication unit. The communication interface 25 is an interface for communication connection with a card reader/writer (RW) included in the user terminal 3 or a card reader/writer connected to the user terminal 3 via the interface. The communication interface 25 realizes a communication function by a communication method conforming to the interface of the card RW. Furthermore, the communication interface 25 may be configured to support a plurality of communication methods (for example, contact communication and non-contact communication).

In a case where the IC card 2 is realized as a contactless IC card, the communication interface 25 constitutes a communication unit that communicates with the card RW included in the user terminal 3 or the card RW connected to the user terminal 3 via the interface in a contactless (wireless) manner. In this case, the communication interface 25 includes an antenna that transmits and receives a radio wave, and includes a modulation circuit configured to generate a radio wave to be transmitted from the antenna, a demodulation circuit configured to generate a signal from the radio wave received by the antenna, and the like.

Furthermore, in a case where the IC card 2 is realized as a contact type IC card, the communication interface 25 constitutes a communication unit that communicates in contact with the card RW included in the user terminal 3 or the card RW connected to the user terminal 3 via the interface. In this case, the communication interface 25 includes a contact unit physically and electrically contacting a contact unit provided in the card RW, and includes a communication control circuit or the like that controls transmission and reception of a signal via the contact unit.

The biometric sensor 20 is an example of an authentication information acquisition unit that acquires authentication information. The biometric sensor 20 is a sensor that acquires biometric information of a person as authentication information used for the authentication process. In the first embodiment, the biometric sensor 20 is a fingerprint sensor that reads fingerprint information (fingerprint image) of the user. The fingerprint sensor as the biometric sensor 20 is provided such that a sensor configured to read a fingerprint is exposed on the surface of the card main body C, and reads a fingerprint of a finger of a person held over the exposed sensor portion. The fingerprint authentication is executed when the fingerprint information read by the biometric sensor 20 is collated with the fingerprint information stored in the second storage area 24b of the data memory 24.

Note that the biometric sensor 20 is not limited to the fingerprint sensor, and may be a sensor that acquires biometric information (for example, palm print, vein, iris, and the like) other than the fingerprint. In the case of including a sensor that acquires biometric information other than a fingerprint, the IC card 2 may have a function (for example, an IC chip that executes palm print matching, vein matching, iris matching, and the like) of performing biometric authentication corresponding to the biometric information acquired by the sensor.

Next, a configuration of the user terminal 3 in the IC card issuance system 1 according to the first embodiment will be described.

FIG. 3 is a block diagram illustrating a configuration example of the user terminal 3 in the IC card issuance system 1 according to the first embodiment.

The user terminal 3 is an electronic apparatus in which various application programs are executed on an operating system (OS). The user terminal 3 is only required to be an electronic apparatus used by a user as a card holder carrying the IC card 2. For example, the user terminal 3 is a mobile terminal including a card RW such as a smartphone, a tablet terminal, or a mobile phone, or a mobile terminal including an interface that is connected to the card RW. Further, the user terminal 3 may be a personal computer (PC) including the card RW or a PC including an interface that is connected to the card RW.

In the configuration example illustrated in FIG. 3, the user terminal 3 includes a processor 31, a ROM 32, a RAM 33, a data memory 34, a network (NW) communication unit 35, a card reader/writer (RW) 36, a display unit 37, an input unit 38, and the like.

The processor 31 executes various processes by executing a program. The processor 31 is, for example, a central processing unit (CPU). The processor 31 is connected to each unit in the user terminal 3 via a system bus to transmit and receives data to and from each unit. The processor 31 executes operations such as control and data processing in the user terminal 3 in cooperation with the ROM 32 and the RAM 33. For example, the processor 31 realizes various processing functions by executing an application program stored in the ROM 32 or the data memory 34. However, some or all of various functions executed by the processor 31 described later may be implemented by a hardware circuit.

The read only memory (ROM) 32 is a nonvolatile memory that stores programs, control data, and the like for realizing basic operations of the user terminal 3. For example, the ROM 32 stores a program that manages basic operations such as an operating system (OS). Further, the ROM 32 may store an application program or the like for realizing the function of the user terminal 3. The ROM 32 may be configured by a rewritable nonvolatile memory. For example, the rewritable ROM 32 is realized by an electrically erasable programmable ROM (EEPROM), a flash ROM, or the like.

The random access memory (RAM) 33 is a volatile memory that temporarily stores data. The RAM 33 functions as a working memory in a case where the processor 31 executes a program.

The data memory 34 is a storage unit that stores various pieces of data. The data memory 34 is configured by a nonvolatile memory in which data is rewritable. For example, the data memory 34 includes a semiconductor element memory such as a flash ROM or a solid state drive (SSD), or a storage apparatus such as a hard disc drive (HDD). The data memory 34 stores an application program, an operation setting value, personal information, and the like. The data memory 34 may store an OS program.

The NW communication unit 35 is a communication interface for communicating with an external apparatus. The NW communication unit 35 may perform wireless communication or may perform wired communication. In the IC card issuance system 1, the NW communication unit 35 is only required to communicate with the contract management server 4A and the data generation server 5A via the interface.

The card reader/writer 36 has a function of communicating with the IC card 2. The card reader/writer 36 performs power supply, clock supply, reset control, and data transmission/reception with respect to the IC card 2. After activating the IC card 2, the card reader/writer 36 transmits various commands and receives responses to the transmitted commands under the control of the processor 31. Note that the user terminal 3 may include an interface connected to a card reader/writer as external equipment.

The card reader/writer 36 has a configuration corresponding to a communication method included in the IC card 2. For example, in a case where the IC card 2 is realized as a contactless IC card, the card reader/writer 36 communicates with the IC card 2 in a contactless (wireless) manner using a communication protocol conforming to a communication method of the contactless IC card. Furthermore, in a case where the IC card 2 is realized as a contact type IC card, the card reader/writer 36 includes a contact unit that is physically and electrically in contact with a contact unit (interface) of the IC card 2 to transmit and receives data via the contact unit.

The display unit 37 is a display device such as a liquid crystal panel. The input unit 38 is an operation device that receives an operation instruction to the user terminal 3. The input unit 38 includes, for example, a touch panel. The display unit 37 and the input unit 38 may be configured by a display apparatus with a touch panel (hereinafter, referred to as a touch screen). Furthermore, the input unit 38 may include an operation key including a button switch, a touch sensor that detects a touch of the operator's finger based on a change in electrostatic capacitance, and the like.

Next, a configuration of the contract management server 4A in the IC card issuance system 1 according to the first embodiment will be described.

FIG. 4 is a block diagram illustrating a configuration example of the contract management server 4A in the IC card issuance system 1 according to the first embodiment.

As illustrated in FIG. 4, the contract management server 4A includes a processor 41, a ROM 42, a RAM 43, a data memory 44, an interface 45, a network (NW) communication unit 46, and a communication unit 47.

The processor 41 executes various processes by executing a program. The processor 41 is, for example, a central processing unit (CPU). The processor 41 is connected to each unit in the server 4A via a system bus to transmit and receives data to and from each unit. The processor 41 executes operations such as control and data processing in the contract management server 4A in cooperation with the ROM 42 and the RAM 43.

The read only memory (ROM) 42 is a nonvolatile memory that stores programs, control data, and the like for realizing the basic operation of the contract management server 4A.

The random access memory (RAM) 43 is a volatile memory that temporarily stores data. The RAM 43 functions as a working memory in a case where the processor 41 executes a program.

The data memory 44 is a storage unit that stores various pieces of data. The data memory 44 is configured by a nonvolatile memory in which data is rewritable. For example, the data memory 44 stores an OS program, an application program, operation setting information, and the like.

The interface 45 is an interface configured to access the data storage 4B. In a case where the data storage 4B is a storage apparatus as an external device, the interface 45 is only required to conform to the interface standard included in the storage apparatus as the data storage 4B. In a case where the data storage 4B is a data server or the like, the interface may be configured by a communication interface for communicating with a server as the data storage 4B.

The network (NW) communication unit 46 is a communication interface for communicating with an external apparatus. The NW communication unit 46 may perform wireless communication or may perform wired communication. In the IC card issuance system 1 according to the first embodiment, the NW communication unit 46 is only required to communicate with the user terminal 3 used by the user via a wide area network such as the Internet.

The communication unit 47 is a communication interface for communicating with the data generation server. The communication unit 47 may perform wireless communication or may perform wired communication. In the IC card issuance system 1 according to the first embodiment, the communication unit 47 is only required to be able to securely communicate with the data generation server 5A.

Note that the NW communication unit 46 and the communication unit 47 may be implemented by one communication interface. Furthermore, the interface 45 may also be configured as a communication interface common to the NW communication unit 46 or the communication unit 47.

Next, a configuration of the data generation server 5A in the IC card issuance system 1 according to the first embodiment will be described.

FIG. 5 is a block diagram illustrating a configuration example of the data generation server 5A in the IC card issuance system 1 according to the first embodiment.

As illustrated in FIG. 5, the data generation server 5A includes a processor 51, a ROM 52, a RAM 53, a data memory 54, an interface 55, a network (NW) communication unit 56, and a communication unit 57.

The processor 51 executes various processes by executing a program. The processor 51 is, for example, a central processing unit (CPU). The processor 51 is connected to each unit in the server 5A via a system bus to transmit and receives data to and from each unit. The processor 51 executes operations such as control and data processing in the data generation server 5A in cooperation with the ROM 52 and the RAM 53.

The read only memory (ROM) 52 is a nonvolatile memory that stores programs, control data, and the like for realizing the basic operation of the data generation server 5A.

The random access memory (RAM) 53 is a volatile memory that temporarily stores data. The RAM 53 functions as a working memory in a case where the processor 51 executes a program.

The data memory 54 is a storage unit that stores various pieces of data. The data memory 54 is configured by a nonvolatile memory in which data is rewritable. For example, the data memory 54 stores an OS program, an application program, operation setting information, and the like.

The interface 55 is an interface configured to access the HSM 5B. The interface 55 is only required to conform to the interface standard included in the HSM 5B.

The network (NW) communication unit 56 is a communication interface for communicating with an external apparatus. The NW communication unit 56 may perform wireless communication or may perform wired communication. In the IC card issuance system 1 according to the first embodiment, the NW communication unit 56 is only required to communicate with the user terminal 3 used by the user via a wide area network such as the Internet.

The communication unit 57 is a communication interface for communicating with the contract management server 4A. The communication unit 57 may perform wireless communication or may perform wired communication. In the IC card issuance system 1 according to the first embodiment, the communication unit 57 is only required to be able to securely communicate with the contract management server 4A.

Note that the NW communication unit 56 and the communication unit 57 may be implemented by one communication interface.

Next, an application procedure and an issuance procedure of the issuance process of the IC card 2 in the IC card issuance system 1 according to the first embodiment will be described.

As a precondition of the operation described below, it is assumed that the IC card 2 is passed to the user (card holder) after primary issuance (card manufacturing and initialization) processing is performed. In addition, it is assumed that a key (key information) related to generation of card authentication data in primary issuance is written in the IC card 2 passed to the user. The key information written in the IC card 2 is stored in the HSM 5B in the issuance control system 5. Further, it is assumed that, in the IC card 2 possessed by the user (card holder), fingerprint information of the user (the person himself/herself) is written after personal authentication of the user is performed.

First, an application procedure of the issuance process of the IC card 2 in the IC card issuance system 1 according to the first embodiment will be described.

FIG. 6 is a sequence for describing an operation example of an application procedure of the issuance process of the IC card 2 in the IC card issuance system 1.

For the card holder, the processor 31 of the user terminal 3 receives the input of the application data by the input unit 38 according to the operation by the user as the card holder (ST21). The application data is assumed to include, for example, information necessary for the issuance process (secondary issuance or function addition), personal information of the user who is the card holder, information about the IC card 2 possessed by the card holder (user), and the like.

In addition, the user terminal 3 may receive the application data by an application program, or may receive the application data on a web site for inputting the application data provided on the Internet. In the former case, the user terminal 3 installs an application program in the data memory 34. The processor 31 of the user terminal 3 activates the application program according to the operation by the user, and the user inputs the application data according to the input format of the application data presented in the application program. In the latter case, the processor 31 of the user terminal 3 accesses the application data input site provided on the Internet by the NW communication unit 35, and the user inputs the application data according to the input format of the application data presented at the input site.

Further, the user terminal 3 may read information related to the IC card 2 possessed by the card holder (user) from the IC card 2. The information (card data) related to the IC card 2 includes, for example, unique identification information (ID) for identifying the IC card 2. In addition, in a case where the personal information of the user himself/herself who is the card holder is stored in the IC card 2, the user terminal 3 may read the personal information of the user from the IC card 2. In the operation example illustrated in FIG. 6, it is assumed that the IC card 2 outputs the card data after the identity confirmation in the biometric (fingerprint) authentication succeeds in response to a request from the card reader/writer 36 of the user terminal 3.

That is, the processor 31 of the user terminal 3 transmits a fingerprint authentication request as biometric authentication and a card data request to the IC card 2 by the card RW 36 (ST22). The processor 21 of the IC card 2 executes fingerprint authentication using fingerprint data stored in the data memory 24 in response to a request from the user terminal 3 (ST11). The processor 21 of the IC card 2 outputs the information about the IC card 2 to the user terminal 3 after the identity confirmation by the fingerprint authentication succeeds (ST12).

When the input of the application data is completed, the processor 31 of the user terminal 3 creates an examination request for requesting examination regarding the issuance process (contract) by the input application data (ST23). The examination request requests examination as to whether the IC card 2 possessed by the card holder is allowed to execute (contract) the issuance process (secondary issuance or function addition) according to the application content input as the application data.

When the examination request is created, the processor 31 of the user terminal 3 transmits the examination request to the contract management server 4A of the data management system 4 (ST24). The processor 31 accesses the contract management server 4A via the Internet by the NW communication unit 35 to transmit the examination request to the contract management server 4A.

The contract management server 4A receives the examination request from the user terminal 3 by the NW communication unit 46 (ST31). Upon receiving the examination request from the user terminal 3, the processor 41 of the contract management server 4A examines whether to permit the issuance process applied in accordance with the received examination request. For example, the contract management server 4A examines whether there is a problem in the application content indicated by the application data and whether there is a problem in the contract for performing the issuance process with respect to the card holder as the applicant. The content and procedures of the examination are not limited to specific forms as long as they conform to the operation form. It is sufficient that the examination result corresponding to the examination request is input to the contract management server 4A.

In a case where the examination result for the examination request indicates that the contract is not allowed (issuance process is not allowed), the processor 41 of the contract management server 4A notifies the user terminal 3, which is the transmission source of the examination request, that the contract is not allowed as the examination result (ST34). In addition, the processor 41 may notify the contact address specified by the card holder in the application data of the examination result.

When the processor 31 of the user terminal 3 receives a notification indicating that the contract is not allowed as the examination result for the examination request from the contract management server 4A, the processor 31 notifies the card holder of the fact that the examination result is that the contract is not allowed by displaying the fact on the display unit 37 (ST25).

When the examination result for the examination request indicates that the contract is allowed (issuance process is allowed), the processor 41 of the contract management server 4A issues the contract ID (ST32). When the contract ID is issued, the processor 41 registers the application data included in the examination request and the examination result for which indicates that the contract is allowed in the data storage 4B in association with the contract ID that has been issued (ST33). The data storage 4B stores the application data from the contract management server 4A and the contract ID as contract information (ST41).

When the application data and the contract ID are registered in the data storage 4B, the processor 41 of the contract management server 4A notifies the user terminal 3, which is the transmission source of the examination request, of the examination result and the contract ID (ST34).

When the processor 31 of the user terminal 3 receives a notification indicating that the contract is allowed as the examination result for the examination request from the contract management server 4A, the processor 31 displays the contract ID on the display unit 37 together with a guidance indicating that the contract is allowed as the examination result (ST25). Furthermore, in a case where the examination result is acceptable, the processor 31 of the user terminal 3 may display, on the display unit 37, guidance regarding the procedure of the issuance process, and the like.

Through the application procedure as described above, when the result for the examination request from the user terminal is that the contract is allowed, the contract management server can store the application data from the card holder that has made the examination request and the contract ID in the data storage in association with each other. As a result, the IC card 2 possessed by the card holder is ready to be able to perform the issuance process in remote by an operation as described later can be performed. As a result, after a state in which the issuance process can be performed, that is, after receiving the notification of the contract ID, the card holder executes an issuance procedure described later for causing the IC card 2 to perform the issuance process in remote using the user terminal 3.

Next, an issuance procedure for causing the IC card 2 in the IC card issuance system 1 according to the first embodiment to perform the issuance process will be described.

FIGS. 7 and 8 are sequences for describing an operation example of an issuance procedure for causing the IC card 2 in the IC card issuance system 1 to perform the issuance process.

The user as the card holder activates an application program (hereinafter, referred to as an issuance application) for the issuance process on the IC card 2 in the user terminal 3. The issuance application may be stored in the data memory 24 in advance, or may be downloaded from the contract management server 4A or the data generation server 5A.

The processor 31 of the user terminal 3 activates the issuance application in response to the instruction to activate the issuance application input to the input unit 38 by the card holder (ST120). When the issuance application is activated, the processor 31 requests the card holder to input a contract ID (ST121). The card holder inputs the contract ID acquired together with the examination result for the application data by the input unit 38. When the contract ID is input to the input unit 38, the processor 31 accesses the IC card 2 with the card RW 36 and requests the IC card 2 to perform fingerprint authentication as biometric authentication for identity confirmation (ST122).

The IC card 2 is activated by power supplied from the card RW 36. When the IC card 2 is activated, the processor 21 executes a fingerprint authentication process in response to a fingerprint authentication request supplied from the card RW 36 (ST111). The processor 21 acquires a fingerprint of the user by the fingerprint sensor 20. The processor 21 performs fingerprint authentication by comparing fingerprint information acquired by the fingerprint sensor 20 with fingerprint data stored in the data memory 24.

When it is determined that the fingerprint information acquired by the fingerprint sensor 20 and the fingerprint data stored in the data memory 24 are fingerprints of the same person, the processor 21 determines that the fingerprint authentication is successful. When it is determined that the fingerprint information acquired by the fingerprint sensor 20 and the fingerprint data stored in the data memory 24 are not fingerprints of the same person, the processor 21 determines that the fingerprint authentication has failed.

When the fingerprint authentication in the IC card 2 fails, the processor 21 notifies the card RW 36 that the fingerprint authentication fails. When the card RW 36 receives a notification indicating that the fingerprint authentication has failed from the IC card 2, the processor 31 of the user terminal 3 cancels the issuance procedure for causing the IC card 2 to execute the issuance process. In this case, the processor 31 notifies the user of the cancellation of the issuance procedure by displaying, on the display unit 37, the fact that the IC card 2 is not allowed to perform the issuance process due to failure of the identity confirmation.

When the fingerprint authentication in the IC card 2 is successful, the processor 21 notifies the card RW 36 that the fingerprint authentication is successful. When the card RW 36 receives a notification indicating that the fingerprint authentication has succeeded from the IC card 2, the processor 31 of the user terminal 3 requests the IC card 2 via the card RW 36 for the card authentication data for executing the issuance process. In response, the processor 21 of the IC card 2 generates card authentication data and supplies the generated card authentication data to the card RW 36.

That is, when the fingerprint authentication is successful, the processor 21 of the IC card 2 generates card authentication data (authentication data) (ST112). The card authentication data is authentication data generated in a case where the biometric authentication succeeds with the IC card 2, and includes information for the IC card 2 to perform the issuance process such as function addition (for example, adding an applet) or secondary issuance.

The card authentication data is generated using the key information stored in the storage area 24a of the data memory 24 that is the secure memory. In addition, the card authentication data includes, for example, CPLC (information indicating a product cycle of the IC card), an INITIAL-IZE UPDATE command, response data, and the like as information for performing the issuance process.

When the card authentication data is generated after the fingerprint authentication succeeds, the processor 21 of the IC card 2 outputs the generated card authentication data to the card RW 36 of the user terminal 3 (ST113). After outputting the card authentication data, the processor 21 of the IC card 2 is ready to be able to execute the issuance process based on the issuance data generated by the data generation server 5A according to the card authentication data is executable.

When acquiring the card authentication data from the IC card 2 with which fingerprint authentication has succeeded by the card RW 36, the processor 31 of the user terminal 3 generates an issuance request for requesting the IC card 2 for the issuance process to transmit the generated issuance request to the data generation server 5A (ST124).

For example, the processor 31 generates an issuance request including the card authentication data and the contract ID. When the issuance request is generated, the processor 31 accesses the data generation server 5A in the issuance control system 5 via the Internet by the NW communication unit 35. When accessing the data generation server 5A, the processor 31 transmits an issuance request including the card authentication data and the contract ID to the data generation server 5A.

The data generation server 5A receives the issuance request from the user terminal 3 by the NW communication unit 56. When the issuance request is received, the processor 51 of the data generation server 5A extracts the contract ID included in the issuance request. When extracting the contract ID included in the issuance request, the processor 51 accesses the contract management server 4A via the communication unit 57. When accessing the contract management server 4A, the processor 51 transmits a request (request) for application data corresponding to the contract ID included in the issuance request to the contract management server 4A (ST131).

The contract management server 4A communicates with the data generation server 5A via the communication unit 47. When receiving the request for requesting the application data corresponding to the contract ID from the data generation server 5A, the processor 41 of the contract management server 4A searches the data storage 4B for the application data corresponding to the contract ID (ST141). When detecting the application data corresponding to the contract ID requested from the data generation server 5A, the processor 41 transmits the application data corresponding to the contract ID to the data generation server 5A via the communication unit 47 (ST142).

When the application data corresponding to the contract ID included in the issuance request is received from the contract management server 4A, the processor 51 of the data generation server 5A generates the issuance data for the IC card 2 executing the issuance process based on the application data (ST132). The issuance data includes a command to be executed by the IC card 2 in a series of issuance processes based on the application data and data to be written to the IC card 2 in a series of issuance processes.

For example, in a case where an applet as the issuance process is added to the IC card 2, the issuance data includes an install (INSTALL) command as a command to be executed by the IC card 2. In addition, in a case where an applet is added according to a certain credit card standard, the issuance data includes an external authentication (EX-TERNAL AUTHENTICATE) command and a store data (STORE DATA) command as commands to be executed by the IC card 2.

Further, the processor 51 processes the issuance data using the key information stored in the HSM 5B in order to securely supply the issuance data to the IC card 2 (ST133). Here, the HSM 5B stores key information corresponding to key information held in the IC card 2. As a result, the issuance data can be securely supplied to the IC card 2 by encryption using the HSM 5B. For example, the processor 51 encrypts data included in the issuance data using key information shared with key information stored in the IC card 2 by the HSM 5B.

After the issuance data is encrypted using the key information stored in the HSM 5B, the processor 51 transmits the issuance data encrypted using the HSM 5B to the user terminal 3 that is the transmission source of the issuance request (ST134).

After transmitting the issuance request to the data generation server 5A, the user terminal 3 waits to receive the issuance data as a response to the issuance request. In this state, the user terminal 3 receives the issuance data transmitted from the data generation server 5A by the NW communication unit 354 (ST125). When the issuance data is received, the processor 31 of the user terminal 3 outputs the issuance data to the IC card 2 by the card RW 36 (ST126).

The processor 21 of the IC card 2 acquires, from the card RW 36 of the user terminal 3, issuance data corresponding to card authentication data generated after the biometric authentication succeeds. When the issuance data is acquired, the processor 21 executes the issuance process according to the acquired issuance data (ST113).

For example, the processor 21 writes, in the data memory 24, data to be written as an issuance process by executing a command included in the issuance data. In addition, the processor 21 decrypts the encrypted data included in the issuance data supplied in the issuance process using the key information stored in the first storage area 24*a* that is the secure memory in the data memory 24.

When the issuance process based on the supplied issuance data is completed, the processor 21 of the IC card 2 notifies the card RW 36 of the user terminal 3 of the completion of the issuance process (ST114).

After outputting the issuance data to the IC card 2 by the card RW 36, the user terminal 3 receives a notification indicating that the issuance process is completed from the IC card 2. Upon receiving the completion notification of the issuance process from the IC card 2 by the card RW 36, the processor 31 of the user terminal 3 displays, on the display unit 37, guidance indicating that the IC card 2 completed the issuance process (function addition or secondary issuance) (ST127).

When receiving the notification that the IC card 2 has completed the issuance process based on the issuance data is, the processor 31 notifies the data generation server 5A that is the transmission source of the issuance data of the completion of the issuance process by the NW communication unit 35 (ST128).

When the NW communication unit 56 receives the completion notification of the issuance process in the IC card 2 from the user terminal 3, the processor 51 of the data generation server 5A transfers (transmits) the completion notification of the issuance process by the IC card 2 to the contract management server 4A by the communication unit 57.

The contract management server 4A receives the completion notification of the issuance process in the IC card 2 via the data generation server 5A by the communication unit 47. When receiving the completion notification of the issuance process in the IC card 2 via the data generation server 5A, the processor 41 of the contract management server 4A records the completion of the issuance process corresponding to the application data in the data storage 4B (ST143).

Through the issuance procedure as described above, the IC card issuance system according to the first embodiment can securely and remotely cause the IC card to perform the issuance process such as function addition or secondary issuance after personal authentication by biometric authentication has succeeded in the IC card 2 including the fingerprint sensor as the biometric sensor.

Second Embodiment

Hereinafter, a second embodiment will be described with reference to the drawings.

First, an IC card issuance system 201 as a remote issuance system according to a second embodiment will be described.

FIG. 9 is a diagram schematically illustrating a configuration example of the IC card issuance system 201 as a remote issuance system according to the second embodiment.

In the configuration example illustrated in FIG. 9, the IC card issuance system 201 includes an IC card 202, a user terminal 203, a data management system 204, and an issuance control system 205.

The IC card 202 is an example of a portable electronic apparatus having a function of executing biometric authentication. The IC card 202 according to the second embodiment includes a biometric sensor 220 configured to acquire biometric information as authentication information acquired from a person. For example, the biometric sensor 220 included in the IC card 202 is a fingerprint sensor that reads a fingerprint as an example of biometric information. The IC card 202 including the fingerprint sensor 220 as a biometric sensor executes fingerprint authentication (biometric authentication) as identity confirmation by collating a fingerprint of a person read by the fingerprint sensor with a fingerprint of a registrant (user, card holder) registered in advance in a memory in the IC card 202.

In addition, the IC card 202 as the portable electronic apparatus according to the present embodiment has a function of outputting physical unclonable function (PUF) data as unique individual device information. The PUF indicates information (ID) unique to an object from a variation in physical characteristics of the object, such as a variation in a silicon crystal pattern of a semiconductor chip. The PUF data is obtained from an electronic circuit included in the IC card 202 such as an IC chip. Since the PUF is caused by variations in individual devices constituting the electronic circuit, even when the circuit pattern is incorrectly copied, the PUF itself is difficult to copy. The PUF data is information unique to each IC card 202.

In the second embodiment, the IC card 202 will be described as a fingerprint sensor card having a function of performing biometric authentication using a fingerprint as biometric information. However, the IC card 202 as the portable electronic apparatus according to the second embodiment is not limited to one that performs fingerprint (biometric) authentication by fingerprint as biometric information. For example, the portable electronic apparatus exemplified by the IC card 202 may perform biometric authentication by biometric information other than a fingerprint.

The user terminal 203 is an information processing apparatus possessed by the user. The user terminal 203 is, for example, a smartphone, a tablet PC, a personal computer, or the like. The user terminal 203 is only required to be operated by the user himself/herself and is only required to include a card reader/writer that communicates with the IC card 202 and a communication unit that communicates with each of the servers 4A and 5A via a network such as the Internet. Furthermore, the user terminal 203 may include an interface that is connected to a card reader/writer as external equipment instead of including a card reader/writer that communicates with the IC card 202.

The data management system 204 is a system that remotely accepts an application for the issuance process (secondary issuance, function addition, or the like) in an IC card held by a user. The data management system 204 includes a contract management server 204A and a data storage 204B. The contract management server 204A is configured by a server apparatus. The data storage 204B is a device including a storage apparatus accessible from the contract management server 204A. The contract management server 204A has a function of accessing the data storage 204B, a function of communicating with the user terminal 203 via the Internet, and a function of communicating with a data generation server 205A of the issuance control system 205.

The contract management server 204A communicates with the user terminal 203 possessed by the user, and acquires application data related to the issuance process (contract) in an IC card possessed by the user from the user terminal 203. Here, the issuance process of an IC card includes secondary issuance or function addition. The secondary issuance of the IC card is a process including a process (personalization) of writing personal data and the like to the IC card passed from the issuer to the user (card holder). In addition, the function addition is a process of adding an application or the like to the IC card. For example, the function addition includes a process of adding an applet to an IC card as a Java Card (registered trademark).

After acquiring the application data from the user terminal 203, the contract management server 204A issues the contract ID when the contract of the application content based on the application data from the user terminal 203 is allowed. When the contract ID is issued, the contract management server 204A makes notification to the issued user terminal 203 to store the application data associated with the contract ID and the PUF data of the IC card 202 possessed by the card holder in the data storage 204B. In response to an inquiry about the application data based on the contract ID from the data generation server 205A in the issuance control system 205, the contract management server 204A provides the application data corresponding to the contract ID and the PUF data stored in the data storage 204B.

The issuance control system 205 is a system for remotely causing the IC card to execute the issuance process (secondary issuance or function addition). The issuance control system 205 includes a data generation server 205A, a hardware security module (HSM) 205B, and a PUF storage 205C.

The data generation server 205A is configured by a server apparatus. The HSM 205B is a device that securely stores key information and performs an encryption process using the key information. The HSM 205B stores key information corresponding to key information, held by the IC card 202, that makes the issuance process remotely executable in the IC card issuance system 201. In addition, the PUF storage 205C is a storage apparatus that holds PUF data, of an IC card, that makes the issuance process remotely executable in the IC card issuance system 201. In the PUF storage 205C, for example, PUF data of the IC card 202 issued (manufactured) by an authorized manufacturer of the IC card by which the issuance process in the IC card issuance system 201 is to be performed is registered.

The data generation server 205A has a function of accessing the HSM 205B, a function of accessing the PUF storage 205C, a function of communicating with the user terminal 203 via the Internet, and a function of communicating with the contract management server 204A of the data management system 204.

The data generation server 205A performs secure communication with the IC card 202 via the user terminal 203 using a key stored in the HSM 205B and an encryption processing function. The data generation server 205A acquires an issuance request including card authentication data generated by the IC card 202 using the key information and the contract ID from the user terminal 203.

The data generation server 205A acquires application data and PUF data managed by the contract management server 204A of the data management system 204 in response to the issuance request from the user terminal 203. The data generation server 205A checks whether the PUF data included in the issuance request is registered in the PUF storage and whether the PUF data included in the issuance request matches the PUF data acquired together with the application data from the contract management server 204A.

After confirming that the PUF data included in the issuance request is registered in the PUF storage and matches the PUF data acquired at the time of application, the data generation server 205A generates the issuance data for causing the IC card to perform the issuance process on based on the application data. The data generation server processes the issuance data based on the application data using the key information stored in the HSM 205B, and then supplies the processed issuance data to the user terminal 203.

Next, a configuration of a control system in the IC card 202 as the portable electronic apparatus according to the second embodiment will be described.

FIG. 10 is a block diagram illustrating a configuration example of the IC card 202 as a portable electronic apparatus according to the second embodiment.

The IC card 202 is an example of a portable electronic apparatus that is activated (is operable) by power supplied from an external apparatus. The IC card 202 is also referred to as a smart card. As illustrated in FIG. 10, the IC card 202 has a main body C. The main body C is formed in a card shape by plastic or the like. The control module M is disposed in the main body C of the IC card 202. The control module M is integrally formed in a state where a communication interface is connected to one or a plurality of IC chips.

In the configuration example illustrated in FIG. 10, the control module M includes a processor 221, a ROM 222, a RAM 223, a data memory 224, and a communication interface 225. In addition, in the main body C of the IC card 202, a display 26 and a fingerprint sensor 220 as a biometric sensor are connected to the control module M.

The processor 221 includes a circuit that executes various processes. The processor 221 is, for example, a central processing unit (CPU). The processor 221 controls the entire IC card 202. The processor 221 implements various processing functions by executing programs stored in the ROM 222 or the data memory 224. However, some or all of various functions executed by the processor 221 described later may be implemented by a hardware circuit.

The ROM 222 is a nonvolatile memory that functions as a program memory. The ROM 222 stores a control program, control data, and the like in advance. The ROM 222 is incorporated into the IC card 202 in a state where a control program, control data, and the like are stored at a manufacturing stage. The control program and the control data stored in the ROM 222 are incorporated in advance according to the specification of the IC card 202. For example, the ROM 222 stores a program for the processor 221 to execute processing according to a command received from an external apparatus (card reader/writer).

The RAM 223 is a volatile memory that functions as a working memory. The RAM 223 also functions as a buffer that temporarily stores data and the like being processed by the processor 221. For example, the RAM 223 functions as a communication buffer that temporarily stores data to be transmitted to and received from an external apparatus via the communication interface 225.

The data memory 224 is a nonvolatile memory capable of writing and rewriting data. The data memory 224 includes, for example, an electrically erasable programmable read only memory (EEPROM) (registered trademark). Programs and various pieces of data according to the operation application of the IC card 202 are written to the data memory 224. In the data memory 224, a program file, a data file, or the like is defined, and a control program and various pieces of data are written in these files. In addition, the data memory 224 has tamper resistance in a part or the entire area, and can securely store data.

The data memory 224 includes a first storage area 224*a* that stores key information, a second storage area 224*b* that stores biometric information, and a third storage area 224*c* that holds PUF data. The first storage area 224*a* is a tamper-resistant memory capable of securely storing data. Key information is written in the first storage area 224*a* in a process (primary issuance) of making the IC card 202 available. In the IC card issuance system 201, the key information corresponding to the key information written in the first storage area 224*a* of the IC card 202 having been issued primarily is stored in the HSM 205B of the issuance control system 205.

In addition, the second storage area 224*b* stores biometric information of the user who is the owner of the IC card 202. For example, it is assumed that the IC card 202 is a fingerprint sensor card that performs biometric information using a fingerprint as biometric information. In a case where the IC card 202 is a fingerprint sensor card, fingerprint information as biometric information of the user who is the owner is written in the second storage area 224*b* of the IC card 202. Note that, in the second embodiment described below, it is assumed that the IC card 202 is possessed by the user in a state in which fingerprint information as biometric information of the user is written in the second storage area before the secondary issuance or the function addition is executed.

The PUF data is stored in the third storage area 224*c*. The PUF data stored in the third storage area 224*c* is an example of identification information unique to the IC card 202. The PUF data stored in the third storage area 224*c* is information obtained from an electronic circuit (IC chip or the like) present in the IC card 202. For example, it is assumed that the PUF data is stored in the third storage area at the time of manufacturing the IC card 202 or the like.

The PUF data is not limited to data stored in the data memory 224 in advance, and may be acquired by the processor 221 in the application procedure and the issuance procedure. For example, instead of storing the PUF data in the data memory 224, the IC card 202 may be provided with a PUF circuit as hardware that outputs the PUF data. In this case, the processor 221 may acquire the PUF data from the PUF circuit.

The communication interface 225 includes a communication control unit and an interface unit, and constitutes a communication unit. The communication interface 225 is an interface for communication connection with a card reader/writer (RW) included in the user terminal 203 or a card reader/writer connected to the user terminal 203 via the interface. The communication interface 225 realizes a communication function by a communication method conforming to the interface of the card RW. Furthermore, the communication interface 225 may be configured to support a plurality of communication methods (for example, contact communication and non-contact communication).

In a case where the IC card 202 is realized as a contactless IC card, the communication interface 225 constitutes a communication unit that communicates with the card RW included in the user terminal 203 or the card RW connected to the user terminal 203 via the interface in a contactless (wireless) manner. In this case, the communication interface 225 includes an antenna that transmits and receives a radio wave, and includes a modulation circuit configured to generate a radio wave to be transmitted from the antenna, a demodulation circuit configured to generate a signal from the radio wave received by the antenna, and the like.

Furthermore, in a case where the IC card 202 is realized as a contact type IC card, the communication interface 225 constitutes a communication unit that communicates in contact with the card RW included in the user terminal 203 or the card RW connected to the user terminal 203 via the interface. In this case, the communication interface 225 includes a contact unit physically and electrically contacting a contact unit provided in the card RW, and includes a communication control circuit or the like that controls transmission and reception of a signal via the contact unit.

The biometric sensor 220 is an example of an authentication information acquisition unit that acquires authentication information. The biometric sensor 220 is a sensor that acquires biometric information of a person as authentication information used for the authentication process. In the second embodiment, the biometric sensor 220 is a fingerprint sensor that reads fingerprint information (fingerprint image) of the user. The fingerprint sensor as the biometric sensor 220 is provided such that a sensor configured to read a fingerprint is exposed on the surface of the card main body C, and reads a fingerprint of a finger of a person held over the exposed sensor portion. The fingerprint authentication is executed when the fingerprint information read by the biometric sensor 220 is collated with the fingerprint information stored in the second storage area 224*b* of the data memory 224.

Note that the biometric sensor 220 is not limited to the fingerprint sensor, and may be a sensor that acquires biometric information (for example, palm print, vein, iris, and the like) other than the fingerprint. In the case of including a sensor that acquires biometric information other than a fingerprint, the IC card 202 may have a function (for example, an IC chip that executes palm print matching, vein matching, iris matching, and the like.) of performing biometric authentication corresponding to the biometric information acquired by the sensor.

Next, a configuration of the user terminal 203 in the IC card issuance system 201 according to the second embodiment will be described.

FIG. 11 is a block diagram illustrating a configuration example of the user terminal 203 in the IC card issuance system 201 according to the second embodiment.

The user terminal 203 is an electronic apparatus in which various application programs are executed on an operating system (OS). The user terminal 203 is only required to be an electronic apparatus used by a user as a card holder carrying the IC card 202. For example, the user terminal 203 is a mobile terminal including a card RW such as a smartphone, a tablet terminal, or a mobile phone, or a mobile terminal including an interface that is connected to the card RW. Further, the user terminal 203 may be a personal computer (PC) including the card RW or a PC including an interface that is connected to the card RW.

In the configuration example illustrated in FIG. 11, the user terminal 203 includes a processor 231, a ROM 232, a RAM 233, a data memory 234, a network (NW) communication unit 235, a card reader/writer (RW) 236, a display unit 237, an input unit 238, and the like.

The processor 231 executes various processes by executing a program. The processor 231 is, for example, a central processing unit (CPU). The processor 231 is connected to each unit in the user terminal 203 via a system bus to transmit and receives data to and from each unit. The processor 231 executes operations such as control and data processing in the user terminal 203 in cooperation with the ROM 232 and the RAM 233. For example, the processor 231 realizes various processing functions by executing an application program stored in the ROM 232 or the data memory 234. However, some or all of various functions executed by the processor 231 described later may be implemented by a hardware circuit.

The read only memory (ROM) 232 is a nonvolatile memory that stores programs, control data, and the like for realizing basic operations of the user terminal 203. For example, the ROM 232 stores a program that manages basic operations such as an operating system (OS). Further, the ROM 232 may store an application program or the like for realizing the function of the user terminal 203. The ROM 232 may be configured by a rewritable nonvolatile memory. For example, the rewritable ROM 232 is realized by an electrically erasable programmable ROM (EEPROM), a flash ROM, or the like.

The random access memory (RAM) 233 is a volatile memory that temporarily stores data. The RAM 233 functions as a working memory in a case where the processor 231 executes a program.

The data memory 234 is a storage unit that stores various pieces of data. The data memory 234 is configured by a nonvolatile memory in which data is rewritable. For example, the data memory 234 includes a semiconductor element memory such as a flash ROM or a solid state drive (SSD), or a storage apparatus such as a hard disc drive (HDD). The data memory 234 stores an application program, an operation setting value, personal information, and the like. The data memory 234 may store an OS program.

The NW communication unit 235 is a communication interface for communicating with an external apparatus. The NW communication unit 235 may perform wireless communication or may perform wired communication. In the IC card issuance system 201, the NW communication unit 235 is only required to communicate with the contract management server 204A and the data generation server 205A via the interface.

The card reader/writer 236 has a function of communicating with the IC card 202. The card reader/writer 236 performs power supply, clock supply, reset control, and data transmission/reception with respect to the IC card 202. After activating the IC card 202, the card reader/writer 236 transmits various commands and receives responses to the transmitted commands under the control of the processor 231. Note that the user terminal 203 may include an interface connected to a card reader/writer as external equipment.

The card reader/writer 236 has a configuration corresponding to a communication method included in the IC card 202. For example, in a case where the IC card 202 is realized as a contactless IC card, the card reader/writer 236 communicates with the IC card 202 in a contactless (wireless) manner using a communication protocol conforming to a communication method of the contactless IC card. Furthermore, in a case where the IC card 202 is realized as a contact type IC card, the card reader/writer 236 includes a contact unit that is physically and electrically in contact with a contact unit (interface) of the IC card 202 to transmit and receives data via the contact unit.

The display unit 237 is a display device such as a liquid crystal panel. The input unit 238 is an operation device that receives an operation instruction to the user terminal 203. The input unit 238 includes, for example, a touch panel. The display unit 237 and the input unit 238 may be configured by a display apparatus with a touch panel (hereinafter, referred to as a touch screen). Furthermore, the input unit 238 may include an operation key including a button switch, a touch sensor that detects a touch of the operator's finger based on a change in electrostatic capacitance, and the like.

Next, a configuration of the contract management server 204A in the IC card issuance system 201 according to the second embodiment will be described.

FIG. 12 is a block diagram illustrating a configuration example of a contract management server 204A in the IC card issuance system 201 according to the second embodiment.

As illustrated in FIG. 12, the contract management server 204A includes a processor 241, a ROM 242, a RAM 243, a data memory 244, an interface 245, a network (NW) communication unit 246, and a communication unit 247.

The processor 241 executes various processes by executing a program. The processor 241 is, for example, a central processing unit (CPU). The processor 241 is connected to each unit in the server 4A via a system bus to transmit and receives data to and from each unit. The processor 241 executes operations such as control and data processing in the contract management server 204A in cooperation with the ROM 242 and the RAM 243.

The read only memory (ROM) 242 is a nonvolatile memory that stores programs, control data, and the like for realizing the basic operation of the contract management server 204A.

The random access memory (RAM) 243 is a volatile memory that temporarily stores data. The RAM 243 functions as a working memory in a case where the processor 241 executes a program.

The data memory 244 is a storage unit that stores various pieces of data. The data memory 244 is configured by a nonvolatile memory in which data is rewritable. For example, the data memory 244 stores an OS program, an application program, operation setting information, and the like.

The interface 245 is an interface configured to access the data storage 204B. In a case where the data storage 204B is a storage apparatus as an external device, the interface 245 is only required to conform to the interface standard included in the storage apparatus as the data storage 204B. In addition, in a case where the data storage 204B is a data server or the like, the interface may be configured by a communication interface for communicating with a server as the data storage 204B.

The network (NW) communication unit 246 is a communication interface for communicating with an external apparatus. The NW communication unit 246 may perform wireless communication or may perform wired communication. In the IC card issuance system 201 according to the second embodiment, the NW communication unit 246 is only required to communicate with the user terminal 203 used by the user via a wide area network such as the Internet.

The communication unit 247 is a communication interface for communicating with the data generation server 205A. The communication unit 247 may perform wireless communication or may perform wired communication. In the IC card issuance system 201 according to the second embodiment, the communication unit 247 is only required to be able to securely communicate with the data generation server 205A.

Note that the NW communication unit 246 and the communication unit 247 may be implemented by one communication interface. Furthermore, the interface 245 may also be configured as a communication interface common to the NW communication unit 246 or the communication unit 247.

Next, a configuration of the data generation server 205A in the IC card issuance system 201 according to the second embodiment will be described.

FIG. 13 is a block diagram illustrating a configuration example of the data generation server 205A in the IC card issuance system 201 according to the second embodiment.

As illustrated in FIG. 13, the data generation server 205A includes a processor 251, a ROM 252, a RAM 253, a data memory 254, an interface 255, a network (NW) communication unit 256, a communication unit 257, and an interface 258.

The processor 251 executes various processes by executing a program. The processor 251 is, for example, a central processing unit (CPU). The processor 251 is connected to each unit in the server 5A via a system bus to transmit and receives data to and from each unit. The processor 251 executes operations such as control and data processing in the data generation server 205A in cooperation with the ROM 252 and the RAM 253.

The read only memory (ROM) 252 is a nonvolatile memory that stores programs, control data, and the like for realizing the basic operation of the data generation server 205A.

The random access memory (RAM) 253 is a volatile memory that temporarily stores data. The RAM 253 functions as a working memory in a case where the processor 251 executes a program.

The data memory 254 is a storage unit that stores various pieces of data. The data memory 254 is configured by a nonvolatile memory in which data is rewritable. For example, the data memory 254 stores an OS program, an application program, operation setting information, and the like.

The interface 255 is an interface configured to access the HSM 205B. The interface 255 is only required to conform to the interface standard included in the HSM 205B.

The network (NW) communication unit 256 is a communication interface for communicating with an external apparatus. The NW communication unit 256 may perform wireless communication or may perform wired communication. In the IC card issuance system 201 according to the second embodiment, the NW communication unit 256 is only required to communicate with the user terminal 203 used by the user via a wide area network such as the Internet.

The communication unit 257 is a communication interface for communicating with the contract management server 204A. The communication unit 257 may perform wireless communication or may perform wired communication. In the IC card issuance system 201 according to the second embodiment, the communication unit 257 is only required to be able to securely communicate with the contract management server 204A.

Note that the NW communication unit 256 and the communication unit 257 may be implemented by one communication interface.

The interface 258 is an interface configured to access the PUF storage 205C. The interface 258 is only required to conform to the interface standard included in the PUF storage 205C. The processor 251 checks the PUF data registered in the PUF storage 205C via the interface 258.

Next, an application procedure and an issuance procedure of the issuance process in the IC card 202 in the IC card issuance system 201 according to the second embodiment will be described.

As a precondition of the operation described below, it is assumed that the IC card 202 is passed to the user (card holder) after primary issuance (card manufacturing and initialization) processing is performed. In addition, it is assumed that a key (key information) related to generation of card authentication data in primary issuance is written in the IC card 202 passed to the user. The key information written in the IC card 202 is stored in the HSM 205B in the issuance control system 205. Further, it is assumed that, in the IC card 202 possessed by the user (card holder), fingerprint information of the user (person himself/herself) is written after personal authentication of the user is performed.

First, an application procedure of the issuance process in the IC card 202 in the IC card issuance system 201 according to the second embodiment will be described.

FIG. 14 is a sequence for describing an operation example of an application procedure of the issuance process in the IC card 202 in the IC card issuance system 201.

For the card holder, the processor 231 of the user terminal 203 receives the input of the application data by the input unit 238 according to the operation by the user as the card holder (ST221). The application data is assumed to include, for example, information necessary for the issuance process (secondary issuance or function addition), personal information of the user who is the card holder, information about the IC card 202 possessed by the card holder (user), and the like.

In addition, the user terminal 203 may input the application data by an application program, or may input the application data on a web site for inputting the application data provided on the Internet. In the former case, the user terminal 203 installs an application program in the data memory 234. The processor 231 of the user terminal 203 activates the application program according to the operation by the user, and the user inputs the application data according to the input format of the application data presented in the application program. In the latter case, the processor 231 of the user terminal 203 accesses the application data input site provided on the Internet by the NW communication unit 235, and the user inputs the application data according to the input format of the application data presented at the input site.

In addition, the processor 231 of the user terminal 203 reads, from the IC card 202, information related to the IC card 202 possessed by the card holder (user) in addition to the information about the application data input by the input unit 238. Here, the information related to the IC card 202 includes PUF data as unique identification information (ID) for identifying the IC card 202.

Furthermore, in a case where the personal information of the user himself/herself who is the card holder is stored in the IC card 202, the processor 231 of the user terminal 203 may read the personal information of the user from the IC card 202.

In the operation example illustrated in FIG. 14, the IC card 202 outputs information related to the IC card including the PUF data after the identity confirmation in the biometric authentication succeeds in response to the request from the card RW 236 of the user terminal 203.

In this case, the processor 231 of the user terminal 203 transmits a fingerprint authentication request as biometric authentication and a PUF data output request to the IC card 202 by the card RW 236 (ST222). The processor 221 of the IC card 202 executes fingerprint authentication using fingerprint data stored in the data memory 224 in response to a request from the user terminal 203 (ST211). The processor

221 of the IC card 202 outputs the card data including the OPUF data of the IC card 202 to the user terminal 203 after the identity confirmation by the fingerprint authentication succeeds (ST212).

When the input of the application data and the acquisition of the PUF data are completed, the processor 231 of the user terminal 203 creates an examination request for requesting examination regarding the issuance process (contract) in the input application data (ST223). The examination request requests examination as to whether the IC card 202 possessed by the card holder is allowed to execute (contract) an issuance process (secondary issuance or function addition) according to the application content input as the application data. In addition, the examination request includes the PUF data acquired from the IC card 202.

When the examination request including the application data and the PUF data is created, the processor 231 of the user terminal 203 transmits the examination request to the contract management server 204A of the data management system 204 (ST224). The processor 231 accesses the contract management server 204A via the Internet by the NW communication unit 235 to transmit an examination request to the contract management server 204A.

The contract management server 204A receives an examination request from the user terminal 203 by the NW communication unit 246 (ST231). Upon receiving the examination request from the user terminal 203, the processor 241 of the contract management server 204A examines whether to permit the issuance process applied in accordance with the received examination request.

For example, the contract management server 204A examines whether there is a problem in the application content indicated by the application data and whether there is a problem in the contract for performing the issuance process with respect to the card holder that is the applicant. The content and procedures of the examination are not limited to specific forms as long as they conform to the operation form. That is, the examination procedure may be any procedure as long as the examination result for the examination request is input to the contract management server 204A.

In a case where the examination result for the examination request indicates that the contract is not allowed (issuance process is not allowed), the processor 241 of the contract management server 204A notifies the user terminal 203, which is the transmission source of the examination request, that the contract is not allowed as the examination result (ST234). In addition, the processor 241 may notify the contact address specified by the card holder in the application data of the examination result.

When the processor 231 of the user terminal 203 receives a notification indicating that the contract is not allowed as the examination result for the examination request from the contract management server 204A, the processor 231 notifies the card holder of the fact that the examination result is that the contract is not allowed by displaying the fact on the display unit 237 (ST225).

In a case where the examination result for the examination request indicates that the contract is allowed (issuance process is allowed), the processor 241 of the contract management server 204A issues the contract ID (ST232). When the contract ID is issued, the processor 241 registers the application data and the PUF data included in the examination request the examination result for which indicates that the contract is allowed in the data storage 204B in association with the issued the contract ID (ST233). As a result, the data storage 204B stores information in which the application data from the contract management server 204A, the PUF data, and the contract ID are associated with each other (ST241).

When the application data, the PUF data, and the contract ID are registered in the data storage 204B, the processor 241 of the contract management server 204A notifies the user terminal 203, which is the transmission source of the examination request, of the contract ID together with the examination result (ST234).

When the processor 231 of the user terminal 203 receives a notification indicating that the examination result for the examination request is that the contract is allowed from the contract management server 204A, the processor displays the contract ID on the display unit 237 together with a guidance indicating that the contract is allowed as the examination result (ST225). Here, in a case where the examination result is acceptable, the processor 231 of the user terminal 203 may display, on the display unit 237, guidance regarding the procedure of the issuance process, and the like. Note that the contract ID is only required to be notified to the user serving as the card holder in a case where the examination result indicates that the contract is allowed. For example, the contract management server 204A may notify the contact address (for example, an email address) of the card holder included in the application data of the contract ID.

Through the application procedure as described above, when the result for the examination request from the user terminal is that the contract is allowed, the contract management server can store, in the data storage, the application data from the card holder that has made the examination request, the PUF data of the IC card subject to the issuance process, and the contract ID. As a result, the IC card 202 possessed by the card holder is ready to be able to perform the issuance process in remote by operation as described later. That is, after a state in which the issuance process can be performed, the card holder executes an issuance procedure described later for remotely causing the IC card 202 to perform the issuance process using the user terminal 203.

Next, an issuance procedure for causing the IC card 202 in the IC card issuance system 201 to perform the issuance process according to the second embodiment will be described.

FIGS. 15 and 16 are sequences for describing an operation example of an issuance procedure for causing the IC card 202 in the IC card issuance system 201 to perform the issuance process on.

The user as the card holder activates an application program (hereinafter, referred to as an issuance application) for the issuance process in the IC card 202 in the user terminal 203. The issuance application may be stored in the data memory 224 in advance, or may be downloaded from the contract management server 204A or the data generation server 205A.

The processor 231 of the user terminal 203 activates the issuance application in response to the instruction to activate the issuance application input by the card holder to the input unit 238 (ST320). When the issuance application is activated, the processor 231 requests the card holder to input a contract ID (ST321). The card holder inputs the contract ID acquired together with the examination result for the application data by the input unit 238. When the contract ID is input to the input unit 238, the processor 231 accesses the IC card 202 with the card RW 236, and requests the IC card 202 to perform fingerprint authentication as biometric authentication for identity confirmation (ST322).

The IC card 202 is activated by power supplied from the card RW 236. When the IC card 202 is activated, the processor 221 executes a fingerprint authentication process in response to a request for biometric (fingerprint) authentication supplied from the card RW 236 (ST311). When performing fingerprint authentication, the processor 221 acquires a fingerprint of the user (card holder) by the fingerprint sensor 220. The processor 221 performs fingerprint authentication by comparing fingerprint information acquired by the fingerprint sensor 220 with fingerprint data stored in the second storage area 224b of the data memory 224.

When it is determined that the fingerprint information acquired by the fingerprint sensor 220 and the fingerprint data stored in the second storage area 224b of the data memory 224 are fingerprints of the same person, the processor 221 determines that the fingerprint authentication is successful. When it is determined that the fingerprint information acquired by the fingerprint sensor 220 and the fingerprint data stored in the second storage area 224b are not fingerprints of the same person, the processor 221 determines that fingerprint authentication has failed.

When the fingerprint authentication in the IC card 202 fails, the processor 221 notifies the card RW 236 that the fingerprint authentication fails. When the card RW 236 receives a notification of fingerprint authentication failure from the IC card 202, the processor 231 of the user terminal 203 cancels the issuance procedure for causing the IC card 202 to execute the issuance process. In this case, the processor 231 notifies the user of the cancellation of the issuance procedure by displaying, on the display unit 237, the fact that the IC card 202 is not allowed to perform the issuance process due to failure of the identity confirmation.

When the fingerprint authentication in the IC card 202 is successful, the processor 221 notifies the card RW 236 that the fingerprint authentication is successful. When the card RW 236 receives a notification indicating that the fingerprint authentication is successful from the IC card 202, the processor 231 of the user terminal 203 requests the IC card 202 via the card RW 236 for the card authentication data and the PUF data for executing the issuance process. In response, the processor 221 of the IC card 202 generates the card authentication data and acquires the PUF data, and supplies the generated card authentication data and the PUF data to the card RW 236.

That is, when the fingerprint authentication is successful, the processor 221 of the IC card 202 generates card authentication data (authentication data) (ST312). The card authentication data is authentication data generated in a case where the biometric authentication succeeds with the IC card 202, and includes information for causing the IC card 202 to perform the issuance process such as function addition (for example, adding an applet) or secondary issuance.

The card authentication data is generated using the key information stored in the storage area 224a of the data memory 224 that is the secure memory. In addition, the card authentication data includes, for example, CPLC (information indicating a product cycle of the IC card), an INITIALIZE UPDATE command, response data, and the like as information for performing the issuance process.

When the fingerprint authentication is successful, the processor 221 of the IC card 202 acquires the PUF data which is information unique to the IC card 202. When the PUF data is held in a third storage area 224c of the data memory 224 as illustrated in FIG. 10, the processor 221 acquires the PUF data from the third storage area in the data memory 224. However, in a case where the IC card 202 includes a PUF circuit as a device that outputs PUF data, the processor 221 may acquire the PUF data from the PUF circuit.

When the card authentication data is generated and the PUF data is acquired after the fingerprint authentication succeeds, the processor 221 of the IC card 202 outputs the generated card authentication data and the PUF data to the card RW 236 of the user terminal 203 (ST313). After outputting the card authentication data and the PUF data, the processor 221 of the IC card 202 is ready to be able to execute the issuance process based on the issuance data generated by the data generation server 205A according to the card authentication data can be executed.

When acquiring the card authentication data and the PUF data from the IC card 202 with which fingerprint authentication has succeeded by the card RW 236, the processor 231 of the user terminal 203 generates an issuance request for requesting the IC card 202 for the issuance process to transmit the generated issuance request to the data generation server 205A (ST324).

For example, the processor 231 generates an issuance request including the contract ID input by the input unit 238 in addition to the card authentication data and the PUF data acquired from the IC card 202. When the issuance request including the card authentication data, the PUF data, and the contract ID is generated, the processor 231 accesses the data generation server 205A in the issuance control system 205 via the Internet by the NW communication unit 235. When accessing the data generation server 205A, the processor 231 transmits an issuance request including the card authentication data, the PUF data, and the contract ID to the data generation server 205A.

The data generation server 205A receives the issuance request from the user terminal 203 by the NW communication unit 256. When the issuance request is received, the processor 251 of the data generation server 205A extracts the contract ID included in the issuance request. When extracting the contract ID included in the issuance request, the processor 251 accesses the contract management server 204A via the communication unit 257. When accessing the contract management server 204A, the processor 251 transmits a request (request) for application data corresponding to the contract ID included in the issuance request to the contract management server 204A (ST331).

The contract management server 204A communicates with the data generation server 205A via the communication unit 247. When receiving the request for requesting the application data corresponding to the contract ID from the data generation server 205A, the processor 241 of the contract management server 204A searches the data storage 204B for the application data corresponding to the contract ID (ST341). When detecting the application data corresponding to the contract ID requested from the data generation server 205A, the processor 241 transmits the application data corresponding to the contract ID and the PUF data to the data generation server 205A via the communication unit 247 (ST342).

When the application data corresponding to the contract ID and the PUF data are received from the contract management server 204A, the processor 251 of the data generation server 205A checks whether the PUF data included in the issuance request from the user terminal 203 is registered in the PUF storage 205C and matches the PUF data corresponding to the application data (ST332).

For example, the processor 251 checks whether the PUF data included in the issuance request is registered in the PUF storage 205C. That is, the processor 251 checks (true/false determination) whether the PUF data (the PUF data of the IC card requesting the issuance process) included in the issuance request is registered in the PUF storage 205C and is the PUF data of the authorized IC card. As a result, the processor 251 can confirm that the IC card requesting the issuance process is an authorized product.

When the PUF data included in the issuance request is registered in the PUF storage 205C, the processor 251 further checks whether the PUF data included in the issuance request matches the PUF data acquired from the contract management server 204A. That is, the processor 251 checks whether the PUF data included in the issuance request (the PUF data of the IC card requesting the issuance process) matches the PUF data of the IC card for which the issuance process has been applied. As a result, the processor 251 can confirm that the IC card requesting the issuance process is the same as the IC card for which the application for the issuance process has been made.

When receiving the issuance request from the user terminal 203, the processor 251 of the data generation server 205A may check whether the PUF data included in the issuance request is registered in the PUF storage. That is, the processor 251 may acquire the application data and the PUF data from the contract management server 204A after confirming that the PUF data included in the issuance request is registered in the PUF storage.

In a case where it is confirmed by checking the PUF data that the IC card 202 to be subjected to the issuance process is an authorized product and matches the IC card for which the application has been made, the processor 251 of the data generation server 205A generates the issuance data for causing the IC card 202 to execute the issuance process based on the application data (ST333). The issuance data includes a command to be executed by the IC card 202 in a series of issuance processes based on the application data and data to be written to the IC card 202 in a series of issuance processes.

For example, in a case where an applet as the issuance process is added to the IC card 202, the issuance data includes an install (INSTALL) command as a command to be executed by the IC card 202. Furthermore, in a case where an applet is added according to a certain credit card standard, the issuance data includes an external authentication (EXTERNAL AUTHENTICATE) command and a store data (STORE DATA) command as commands to be executed by the IC card 202.

In addition, the processor 251 processes the issuance data using key information stored in the HSM 205B in order to securely supply the issuance data to the IC card 202 (ST334). Here, the HSM 205B stores key information corresponding to key information held in the IC card 202. As a result, the issuance data can be securely supplied to the IC card 202 by encryption using the HSM 205B. For example, the processor 251 encrypts data included in the issuance data using key information shared with key information stored in the IC card 202 by the HSM 205B.

After the issuance data is encrypted using the key information stored in the HSM 205B, the processor 251 transmits the issuance data encrypted using the HSM 205B to the user terminal 203 that is the transmission source of the issuance request (ST335).

After transmitting the issuance request to the data generation server 205A, the user terminal 203 waits to receive the issuance data as a response to the issuance request. In this state, the user terminal 203 receives the issuance data transmitted from the data generation server 205A by the NW communication unit 2354 (ST325). When the issuance data is received, the processor 231 of the user terminal 203 outputs the issuance data to the IC card 202 by the card RW 236 (ST326).

As a result, the processor 221 of the IC card 202 acquires the issuance data corresponding to the card authentication data generated after the biometric authentication succeeds from the card RW 236 of the user terminal 203. When the issuance data is acquired, the processor 221 executes the issuance process according to the acquired issuance data (ST314).

For example, the processor 221 writes, in the data memory 224, data to be written as the issuance process by executing a command included in the issuance data. In addition, the processor 221 decrypts the encrypted data included in the issuance data supplied in the issuance process using the key information stored in the first storage area 224a that is the secure memory in the data memory 224.

When the issuance process based on the supplied issuance data is completed, the processor 221 of the IC card 202 notifies the card RW 236 of the user terminal 203 of the completion of the issuance process (ST315).

After outputting the issuance data to the IC card 202 by the card RW 236, the user terminal 203 receives a notification indicating that the issuance process is completed from the IC card 202. Upon receiving the completion notification of the issuance process from the IC card 202 by the card RW 236, the processor 231 of the user terminal 203 displays, on the display unit 237, a guidance indicating that the issuance process (function addition or secondary issuance) on the IC card 202 is completed (ST327).

When receiving the notification that the issuance process on the IC card 202 based on the issuance data is completed, the processor 231 notifies the data generation server 205A that is the transmission source of the issuance data of the completion of the issuance process by the NW communication unit 235 (ST328).

When the NW communication unit 256 receives the completion notification of the issuance process on the IC card 202 from the user terminal 203, the processor 251 of the data generation server 205A transfers (transmits) the completion notification of the issuance process on the IC card 202 to the contract management server 204A by the communication unit 257.

The contract management server 204A receives the completion notification of the issuance process on the IC card 202 via the data generation server 205A by the communication unit 247. When receiving the completion notification of the issuance process on the IC card 202 via the data generation server 205A, the processor 241 of the contract management server 204A records the completion of the issuance process corresponding to the application data in the data storage 204B (ST343).

Through the issuance procedure as described above, the IC card issuance system according to the second embodiment can check, using the PUF data, whether the IC card is an authorized product and matches the IC card at the time of application after personal authentication by biometric authentication has succeeded in the IC card including the fingerprint sensor as the biometric sensor. As a result, in the IC card issuance system according to the second embodiment, an IC card that is an authorized product and matches an IC card at the time of application can perform an issuance process such as function addition or secondary issuance in remote The IC card issuance system according to the second embodiment uses the PUF data. This eliminates the need for an operation of artificially generating unique data for each LSI and writing the data in the LSI when generating an IC card as in the related art. This is because the PUF can be automatically generated by a specific algorithm using a physical unique variation such as a crystal pattern of an electronic circuit or a semiconductor.

In addition, in a case where unique data such as an identification code individually attached to the IC card is required, it is necessary that the data is always different from data issued in the past. In this respect, the PUF is always unique data and is not duplicated, and thus is suitable for the invention according to the second embodiment as an ID.

Furthermore, in order to create data specific to the LSI, a creation form or format is generally different depending on the LSI vendor. In this regard, according to the invention of the second embodiment, generation and format of unique data can be unified by using a PUF.

The functions described in the above-described embodiments can be implemented not only by using hardware but also by causing a computer to read a program describing the functions by using software. Furthermore, each function may be configured by appropriately selecting either software or hardware.

Although some embodiments of the present invention have been described, these embodiments have been presented as examples, and are not intended to limit the scope of the invention. These novel embodiments can be implemented in various other forms, and various omissions, substitutions, and changes can be made without departing from the gist of the invention. These embodiments and modifications thereof are included in the scope and gist of the invention, and are included in the invention described in the claims and the equivalent scope thereof.

The invention claimed is:

1. A remote issuance system comprising: a portable electronic apparatus; and a data generation server, wherein the portable electronic apparatus includes a biometric sensor that acquires biometric information, a memory including a storage area in which biometric information of a user is stored, a communication interface that communicates with a reader/writer connected to a user terminal, and a first processor that generates authentication data for performing an issuance process in the portable electronic apparatus in a case where biometric authentication by collation between biometric information acquired by the biometric sensor and biometric information stored in the memory succeeds, outputs the authentication data to the reader/writer, and executes the issuance process based on issuance data corresponding to the authentication data supplied from the reader/writer, and wherein the data generation server includes a communication unit that communicates with the user terminal, and a second processor that generates, in a case where an issuance request including the authentication data generated by the portable electronic apparatus and a contract ID is received from the user terminal, issuance data for causing the portable electronic apparatus to execute an issuance process based on application data corresponding to the contract ID and the authentication data to transmit the generated issuance data to the user terminal.

2. The remote issuance system according to claim 1, wherein the portable electronic apparatus is an IC card including a module including the biometric sensor, the memory, the first processor, and the communication interface, and a main body that stores the module.

3. The remote issuance system according to claim 1, wherein the biometric sensor is a fingerprint sensor that acquires fingerprint information.

4. The remote issuance system according to claim 1, wherein in the portable electronic apparatus, the memory further includes a secure memory that stores key information, and the first processor generates the authentication data using key information stored in the secure memory, and wherein the data generation server further includes an interface connected to a hardware security module that stores key information corresponding to key information stored in the secure memory included in the portable electronic apparatus, and the second processor transmits, to the user terminal, the authentication data processed using the key information stored in the hardware security module and the issuance data based on the application data.

* * * * *